US012577511B2

(12) United States Patent
Bauer et al.

(10) Patent No.: US 12,577,511 B2

(45) Date of Patent: Mar. 17, 2026

(54) AGENT CONTAINING EMULSIFIER AND MICROCAPSULES

(71) Applicant: Henkel AG & Co. KGaA, Duesseldorf (DE)

(72) Inventors: Andreas Bauer, Kaarst (DE); Marc-Steffen Schiedel, Monheim (DE); Stefan Urlichs, Essen (DE); Michael Biedenbach, Oberkirch (DE); Christian Kind, Baden-Baden (DE); Andreas Gerigk, Erkelenz (DE); Manuela Materne, Kaarst (DE); Hubert Smyrek, Krefeld (DE); Christian Giesen, Nettetal (DE)

(73) Assignee: Henkel AG & Co. KGaA, Düsseldorf (DE)

( * ) Notice: Subject to any disclaimer, the term of this patent is extended or adjusted under 35 U.S.C. 154(b) by 466 days.

(21) Appl. No.: 18/080,770

(22) Filed: Dec. 14, 2022

(65) Prior Publication Data

US 2023/0183620 A1 Jun. 15, 2023

(30) Foreign Application Priority Data

Dec. 15, 2021 (EP) .................................... 21214656
Dec. 15, 2021 (EP) .................................... 21214696

(51) Int. Cl.

*C11D 17/08* (2006.01)
*C11D 3/50* (2006.01)
*C11D 7/44* (2006.01)
*C11D 17/00* (2006.01)

(52) U.S. Cl.

CPC ................ *C11D 17/08* (2013.01); *C11D 3/50* (2013.01); *C11D 7/44* (2013.01); *C11D 17/0013* (2013.01)

(58) Field of Classification Search

CPC .. C11D 17/08; C11D 3/50; C11D 7/44; C11D 17/0013

See application file for complete search history.

(56) References Cited

U.S. PATENT DOCUMENTS

| | | | |
|---|---|---|---|
| 2,800,457 A | 7/1957 | Green et al. | |
| 2003/0004226 A1 | 1/2003 | Hoffman et al. | |
| 2015/0017214 A1* | 1/2015 | Warr | A61Q 17/04 510/438 |
| 2015/0210965 A1 | 7/2015 | Bertram et al. | |
| 2019/0358603 A1 | 11/2019 | Jurisch et al. | |

FOREIGN PATENT DOCUMENTS

| | | | | |
|---|---|---|---|---|
| EP | 1246693 B1 | 4/2004 | | |
| EP | 2689835 A1 | 1/2014 | | |
| WO | 2009126742 A2 | 10/2009 | | |
| WO | 2010003762 A1 | 1/2010 | | |
| WO | 2010079466 A2 | 7/2010 | | |
| WO | 2011075425 A1 | 6/2011 | | |
| WO | 2011120772 A1 | 10/2011 | | |
| WO | 2012064325 A1 | 5/2012 | | |
| WO | 2014016395 A1 | 1/2014 | | |
| WO | 2014032920 A1 | 3/2014 | | |
| WO | 2014036082 A2 | 3/2014 | | |
| WO | 2014044840 A1 | 3/2014 | | |
| WO | 2015014628 A1 | 2/2015 | | |
| WO | 2017143174 A1 | 8/2017 | | |
| WO | 2018114056 A1 | 6/2018 | | |
| WO | 2020233773 A1 | 11/2020 | | |
| WO | 2021073774 A1 | 4/2021 | | |
| WO | 2021115600 A1 | 6/2021 | | |
| WO | 2021116432 A1 | 6/2021 | | |
| WO | WO-2021122630 A1 * | 6/2021 | ............... | A61K 8/11 |

OTHER PUBLICATIONS

Search report dated Jul. 5, 2022, issued for corresponding EP application No. 21 214 696.3, 6 pages (for Information Purpose Only).
Search report dated May 25, 2022, issued for corresponding EP application No. 21 214 656.7, 11 pages (for Information Purpose Only).
Gasparini et al., "Quantification of Residual Perfume by Py-GC-MS in Fragrance Encapsulate Polymeric Materials Intended for Biodegradation Tests", Molecules, 2020, 14 pages, vol. 25, No. 718.
Bender et al., "The Determination of the Concentration of Hydrolytic Enzyme Solutions: a-Chymotrypsin, Trypsin, Papain, Elastase, Subtilisin, and Acetylcholinesterase", 1966, pp. 5890-5913, Journal of the American Chemical Society, 88:24.

* cited by examiner

*Primary Examiner* — Joseph S Del Sole
(74) *Attorney, Agent, or Firm* — Blank Rome LLP

(57) ABSTRACT

A composition may be or include detergents, cleaning agents, and cosmetic agents and include an emulsifier and biodegradable microcapsules. The biodegradable microcapsules may include a core material and a shell where the shell consists of at least one barrier layer and a stability layer. The barrier layer may surround the core material. The stability layer may include at least one biopolymer and be arranged on the outer surface of the barrier layer(s).

19 Claims, No Drawings

AGENT CONTAINING EMULSIFIER AND MICROCAPSULES

CROSS-REFERENCE TO RELATED APPLICATION

The present patent application claims priority, according to 35 U.S.C. § 119, from European Patent Application No. 21214696.3 filed on Dec. 15, 2021, and European Patent Application No. 21214656.7 filed on Dec. 15, 2021, both of which are incorporated herein by reference in their entirety and for all purposes.

TECHNICAL FIELD

The disclosure relates to detergents, cleaning agents, and cosmetics which contain biodegradable microcapsules having environmentally compatible wall materials and special emulsifiers.

BACKGROUND

Microencapsulation is a versatile technology. It offers solutions for numerous innovations, from the paper industry to household products, to increase the functionality of a wide range of active substances. Encapsulated active substances can be used more economically and improve the sustainability and environmental compatibility of many products.

However, the polymer wall materials of the microcapsules themselves are environmentally compatible to very different degrees. Microcapsule walls that are based on the natural product gelatin and that are therefore completely biodegradable have been used for a long time in non-carbon paper. A method developed in the 1950s for gelatin encapsulation is disclosed in U.S. Pat. No. 2,800,457. A plurality of variations with respect to materials and method steps have since been described. In addition, biodegradable or enzymatically degradable microcapsule walls are used to utilize the enzymatic degradation as a method for releasing the core material. Microcapsules of this kind are described, for example, in WO 2009/126742 A1 or WO 2015/014628 A1.

However, microcapsules of this kind are not suitable for many industrial applications and household products. This is because natural-based microcapsules do not provide the diffusion resistance required for detergents, cleaning agents, adhesive systems, paints, and dispersions, nor do they provide the chemical resistance, the temperature resistance, or the required loading with core material.

In these so-called high-demand areas, organic polymers such as melamine-formaldehyde polymers (see, for example, EP 2 689 835 A1, WO 2018/114056 A1, WO 2014/016395 A1, WO 2011/075425 A1, or WO 2011/120772 A1); polyacrylates (see, for example, WO 2014/032920 A1, WO 2010/79466 A2); polyamides; polyurethane or polyureas (see, for example, WO 2014/036082 A2 or WO 2017/143174 A1) are traditionally used. The capsules constructed from such organic polymers have the required diffusion resistance, stability, and chemical resistance. However, these organic polymers are only enzymatically degradable or biodegradable to a very limited extent.

Various approaches are described in the prior art in which biopolymers are combined as an additional component with the organic polymers of the microcapsule shell for use in high-demand areas, but not with the objective of producing biodegradable microcapsules, but rather primarily of changing the release, stability, or surface properties of the microcapsules. For example, WO 2014/044840 A1 describes a method for preparing two-layer microcapsules having an inner polyurea layer and an outer gelatin-containing layer. In this case, the polyurea layer is produced by means of polyaddition on the inside of the gelatin layer obtained by coacervation. According to the description, the capsules obtained in this manner have the necessary stability and tightness for use in detergents and cleaning agents, and additionally have a stickiness on account of the gelatin in order to adhere to surfaces. Specific stabilities and resistances are not mentioned. A disadvantage of polyurea capsules, however, is the unavoidable side reaction of the core materials with the diisocyanates used to produce the urea, which diisocyanates must be admixed with the oil-based core.

Moreover, microcapsules based on biopolymers are also described in the prior art, which achieve improved tightness or stability with respect to environmental influences or a targeted adjustment of a delayed release behavior by means of the addition of a protective layer. For example, WO 2010/003762 A1 describes particles having a core-shell-shell structure. In the interior of each particle, the core is an organic active ingredient that is poorly soluble or insoluble in water. The shell directly enclosing the core comprises a biodegradable polymer and the outer shell comprises at least one metal or metalloid oxide. A biodegradable shell is obtained with this structure, and according to WO 2010/003762 A1, the microcapsules are used in food, cosmetics, or pharmaceutical agents, however they cannot be used in the high-demand areas due to a lack of tightness.

In the non-published document PCT/EP2020/085804, microcapsules having a multi-layer shell structure are described, the shells being substantially biodegradable and nevertheless having sufficient stability and tightness in order to be usable in high-demand areas. This is achieved by virtue of the fact that a stability layer makes up the majority of the capsule shell, which consists of naturally occurring and readily biodegradable materials, in particular gelatin or alginate or materials which are ubiquitously present in nature.

This stability layer is combined with a barrier layer, which can consist of known materials used for microencapsulation, such as melamine formaldehyde or meth (acrylate). In this case, it is possible to design the barrier layer to have a small wall thickness that was previously not feasible and nevertheless to ensure sufficient tightness. The proportion of the barrier layer in the overall wall is thus kept very low, such that the microcapsule wall has a biodegradability of at least 40%, measured according to OECD 301 F.

Microcapsules of this kind are typically used in the form of aqueous dispersions, also referred to as suspensions or slurries, in which the microcapsules are dispersed as the solid phase in a predominantly aqueous medium as the continuous phase. It is desirable for dispersions of this kind to have sufficient phase stability in order to provide a stable product without unwanted sediments or creaming even after longer storage or transport times. For this purpose, various additives or auxiliaries which are intended to ensure this stability are often incorporated into the continuous phase. However, these must often be specifically selected depending on the capsules used, since general suitability typically does not exist. The present disclosure relates to agents in which a special emulsifier is used, which provides the desired phase stability for the described microcapsules in the microcapsule dispersion and in the end product containing the microcapsules.

SUMMARY

According to a first aspect, the disclosure relates to agents selected from detergents, cleaning agents, and cosmetic preparations which contain (1) biodegradable microcapsules comprising a core material and a shell, the shell consisting of at least one barrier layer and a stability layer, the barrier layer surrounding the core material, the stability layer comprising at least one biopolymer and being arranged on the outer surface of the barrier layer, and an emulsion stabilizer optionally being arranged at the transition from the barrier layer to the stability layer, and (2) at least one emulsifier, the emulsifier being selected from the group of ethoxylated, hydrogenated castor oils, in particular those having mean EO values in the range of from 20 to 60, preferably 30 to 50.

In preferred embodiments, the at least one emulsifier, based on the total weight of the agent, is contained at 0.001 to 0.25 wt. %, preferably 0.001 to 0.15 wt. %, more preferably 0.001 to 0.08 wt. %, the emulsifier preferably being used in preformulated form with the biodegradable microcapsules.

In various embodiments, the emulsifier is used as a constituent of a microcapsule dispersion (slurry), the dispersion comprising the microcapsules as the solid phase and water as the main constituent of the continuous phase. In embodiments of this kind, the emulsifier is part of the continuous phase.

In a preferred embodiment, the microcapsule dispersion contains the at least one emulsifier in an amount of up to 50 wt. %, preferably up to 40 wt. %, more preferably up to 30 wt. % or up to 20 wt. %, even more preferably up to a maximum of 10 wt. %, particularly preferably in an amount of from 2 to 10 wt. %.

The proportion of the emulsifier in the microcapsule dispersion is preferably 0.5 wt. % to 50 wt. %, preferably 1.0 wt. % to 30 wt. %, more preferably 2 wt. % to 20 wt. %, particularly preferably 4 wt. % to 8 wt. %, based on the total weight of the microcapsule dispersion.

In preferred embodiments, the proportion of the microcapsule dispersion in the agent is at least 0.1 wt. %, preferably at least 0.5 wt. %, based on the total weight of the agent, and preferably the proportion of the emulsifier in the agent, based on the total weight of the agent, is 0.001 to 0.25 wt. %, preferably 0.001 to 0.15 wt. %, more preferably 0.001 to 0.08 wt. %, the agent preferably being liquid.

Furthermore, it is possible to dry the microcapsule dispersion, it being possible for the dried microcapsule dispersion to contain less than 5 wt. %, preferably less than 1 wt. %, of water and, particularly preferably, not comprising water except for unavoidable traces thereof.

In various embodiments, the barrier layer and stability layer differ in terms of their chemical composition or their chemical structure. The core material preferably comprises at least one fragrance and may be, for example, a perfume oil composition.

If the agent is a detergent or cleaning agent, it preferably contains at least one further component selected from surfactants, builders, enzymes, and attachment-enhancing agents. If the agent is a cosmetic agent, it may also contain at least one further component which can be selected, for example, from surfactants and skin care substances.

The emulsion stabilizer is a polymer or copolymer which is composed of particular acrylic acid derivatives, N-vinylpyrrolidone, and/or styrene. In various embodiments, the polymer or copolymer consists of one or more monomers selected from:

(1) acrylic acid derivatives of the general formula (I)

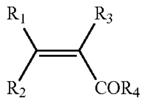

$R_1$, $R_2$ and $R_3$ being selected from: hydrogen and an alkyl group having 1 to 4 carbon atoms, $R_1$ and $R_2$ in particular being hydrogen, and $R^3$ in particular being hydrogen or methyl; and $R_4$ representing —OX or —$NR_5R_6$, X representing hydrogen, an alkali metal, an ammonium group, or a $C_1$-$C_{18}$ alkyl optionally substituted by —$SO_3M$ or —OH, M being hydrogen, an alkali metal, or ammonium, the $C_1$-$C_{18}$ alkyl optionally substituted by —$SO_3M$ or —OH preferably being methyl, ethyl, n-butyl, 2-ethylhexyl, 2-sulfoethyl, or 2-sulfopropyl, $R_5$ and $R_6$ representing, independently of one another, hydrogen or a $C_1$-$C_{10}$ alkyl optionally substituted by —$SO_3M$, at least one of $R_5$ and $R_6$ not being hydrogen, $R_5$ preferably being H, and $R_6$ preferably being 2-methyl-propan-2-yl-1-sulfonic acid;

(2)N-vinylpyrrolidone, and (3) styrene.

The emulsion stabilizer is preferably an acrylate copolymer comprising 2-acrylamido-2-methylpropanesulfonic acid (AMPS). A suitable copolymer is available, for example, under the trade name Dimension PA 140.

In various embodiments, the barrier layer is composed of one or more components selected from the group consisting of an aldehyde component, an aromatic alcohol, an amine component, an acrylate component, and an isocyanate component, and the stability layer comprises at least one biopolymer.

Furthermore, it is advantageous that the improved structural accommodation of the stability layer by the barrier layer by means of the addition of the emulsion stabilizer ensures the structural (covalent) bonding of all wall-forming components, and therefore the individual layers can be inseparably connected and regarded as a monopolymer.

Due to the robustness or tightness of the biodegradable capsules, they can be used in a large number of products from the field of detergents and cleaning agents and also cosmetics.

In preferred embodiments, the agent has a pH of less than 11, preferably less than 10, more preferably less than 9, even more preferably less than 5, and particularly preferably less than 4, and/or a conductivity of at least 0.1 mS/cm, preferably at least 0.2 mS/cm, more preferably at least 0.3 mS/cm, even more preferably at least 1.0 mS/cm, even more preferably at least 2.5 mS/cm, and particularly preferably at least 5.0 mS/cm, and/or a conductivity of at most 100 mS/cm, preferably up to 60 mS/cm, particularly preferably up to 34 mS/cm.

Furthermore, in a further aspect, the disclosure relates to the use of detergents and cleaning agents according to the first aspect in a method for conditioning textiles or for cleaning textiles and/or hard surfaces.

Furthermore, in a further aspect, the disclosure relates to the cosmetic use of agents according to the first aspect.

DETAILED DESCRIPTION

Definitions

"Barrier layer" refers to the layer of a microcapsule wall which is substantially responsible for sealing the capsule shell, i.e. prevents the core material from escaping.

"Biodegradability" refers to the ability of organic chemicals to be decomposed biologically, i.e. by living organisms or the enzymes thereof. Ideally, this chemical metabolism proceeds all the way up to mineralization, but may also stop at non-degradable transformation products. The OECD guidelines for testing chemicals, which are also used within the framework of the chemical approval process, are generally recognized. The tests of OECD test series 301 (A-F) show rapid and complete biological degradation (ready biodegradability) under aerobic conditions. Different test methods are available for highly or poorly soluble and for volatile substances. In particular, the manometric respiratory test (OECD 301 F) is used in the context of the application. The inherent biodegradability can be determined using the measurement standard OECD 302, for example the MITI II test (OECD 302 C).

Within the context herein, "biodegradable" or "biologically degradable" refers to microcapsule walls which have a biodegradability of at least 40% within 60 days, measured according to OECD 301 F. From a limit value of at least 60% degradation within 60 days measured according to OECD 301 F, microcapsule walls are also referred to as being rapidly biodegradable in the present case.

A "biopolymer" is a naturally occurring polymer, for example a polymer occurring in a plant, a fungus, a bacterium, or an animal. Biopolymers also include modified polymers based on naturally occurring polymers. The biopolymer can be obtained from the natural source or produced artificially.

"Tightness" relative to a substance, gas, liquid, radiation, or the like, is a property of material structures. The terms "tightness" and "sealing" are used synonymously. Tightness is a relative term and is always based on predetermined framework conditions.

"Emulsion stabilizers" are auxiliary substances for stabilizing emulsions. The emulsion stabilizers can be added in a small amount to the aqueous or oily phase (of emulsions), said emulsion stabilizers being phase-enriched in the interface and, on the one hand, facilitate the separation of the internal phase by lowering the interfacial tension and, on the other hand, increase the separation resistance of the emulsion.

The term "(meth)acrylate" herein refers both to methacrylates and acrylates.

As used herein, the term "microcapsules" should be understood to mean particles which contain an inner space or core which is filled with a solid, gelled, liquid, or gaseous medium and which is surrounded (encapsulated) by a continuous casing (shell) of film-forming polymers. These particles preferably have small dimensions. The terms "microcapsules", "core-shell capsules", or simply "capsules" are used synonymously.

"Microencapsulation" refers to a preparation method in which small and very small portions of solid, liquid, or gaseous substances are surrounded by a coating consisting of polymer or inorganic wall materials. The microcapsules obtained in this manner can have a diameter of from a few millimeters down to less than 1 μm.

The microcapsule has a multilayer "shell". The shell enclosing the core material of the microcapsule is generally also referred to as "wall" or "coating".

The microcapsules having a multilayer shell can also be referred to as multishell microcapsules or a multishell microcapsule system, since the individual layers can also be regarded as individual shells. "Multilayer" and "multishell" are thus used synonymously.

"Stability layer" refers to the layer of a capsule wall which is substantially responsible for the stability of the capsule shell, i.e. it generally makes up the majority of the shell.

"Wall formers" are the components that build up the microcapsule wall.

"Hydrogenated castor oil" refers to partially or completely hydrogenated castor oil. Castor oil (CAS no. 8001-79-4) is a known vegetable oil which consists of the triglyceride of ricinoleic acid (triricinoline) at a proportion of 80-85%. Further components are glycerides of various other fatty acids and a low proportion of free fatty acids. The hydrogenation converts the triricinoline into the triglyceride of 12-hydroxystearic acid. Ethoxylated, hydrogenated castor oils, which can usually be obtained by reacting hydrogenated castor oil with ethylene oxide, are used. The compounds obtained in this manner and used contain, on average, 20 to 60 ethylene units, more preferably 30 to 50 EO, more preferably 40 EO. PEG-40 hydrogenated Castor oil (INCl) is commercially available, for example, as Eumulgin® HRE 40 from BASF. Compounds of this kind are suitable as nonionic oil-in-water emulsifiers and are offered and used as such.

Microcapsules

The biodegradable microcapsules which are used according to a first embodiment in detergents, cleaning agents, and cosmetic agents comprise a core material and a shell, the shell consisting of at least one barrier layer and a stability layer, the barrier layer surrounding the core material, the stability layer comprising at least one biopolymer and being arranged on the outer surface of the barrier layer, and an emulsion stabilizer preferably being arranged at the transition from the barrier layer to the stability layer. This arrangement may consist of an intermediate layer of emulsion stabilizer, which may be continuous or discontinuous and may cover parts of or the entire inner barrier layer. Alternatively, only individual molecules of the emulsion stabilizer may be arranged on the surface of the barrier layer such that they mediate a bond between the stability layer and the barrier layer. The emulsion stabilizer here acts as a mediator agent.

Owing to the use of the emulsion stabilizer, the stability layer of the microcapsule shells has a significantly increased thickness. As a result, the proportion of natural components in the capsule is further increased compared to previously described multilayer microcapsules.

According to one embodiment of the biodegradable microcapsules, during preparation of the microcapsules, the surface of the barrier layer is brought into contact with the emulsion stabilizer before the stability layer is formed. As a result, the capacity of the surface to structurally bond the stability layer is increased. Without wishing to be limited thereto, the inventors assume that the emulsion stabilizer accumulates on the non-polar surface of the barrier layer, in particular a melamine-formaldehyde layer, and thus provides the biopolymers of the stability layer with a framework for deposition on the surface. As a result, not only is the mean layer thickness of the stability layer produced with the biopolymer increased, the emulsion stabilizer is also incorporated at the interface between the stability layer and the barrier layer. Proceeding from this theory, any emulsion stabilizer is, in principle, suitable as a mediator agent for preparing the microcapsules.

In a preferred embodiment, the emulsion stabilizer is a polymer or copolymer consisting of one or more monomers selected from:

(1) acrylic acid derivatives of the general formula (I)

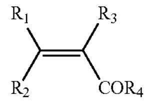

$R_1$, $R_2$ and $R_3$ being selected from: hydrogen and an alkyl group having 1 to 4 carbon atoms, $R_1$ and $R_2$ in particular being hydrogen, and $R_3$ in particular being hydrogen or methyl; and $R_4$ representing —OX or —$NR_5R_6$, X representing hydrogen, an alkali metal, an ammonium group, or a $C_1$-$C_{18}$ alkyl optionally substituted by —$SO_3M$ or —OH, M being hydrogen, an alkali metal, or ammonium, the $C_1$-$C_{18}$ alkyl optionally substituted by —$SO_3M$ or —OH preferably being methyl, ethyl, n-butyl, 2-ethylhexyl, 2-sulfoethyl, or 2-sulfopropyl, $R_5$ and $R_6$ representing, independently of one another, hydrogen or a $C_1$-$C_{10}$ alkyl optionally substituted by —$SO_3M$, at least one of $R_5$ and $R_6$ not being hydrogen, $R_5$ preferably being H, and $R_6$ preferably being 2-methyl-propan-2-yl-1-sulfonic acid;

(2) N-vinylpyrrolidone, and (3) styrene.

The $C_{1-4}$ hydroxyalkyl groups possible for $R_1$, $R_2$, and $R_3$ may be ethyl, n-propyl, i-propyl, and n-butyl. In some embodiments of the acrylic acid derivatives, $R_1$ and $R_2$ are hydrogen and $R_3$ is hydrogen or methyl. Depending on the choice of $R_3$, it is an acrylate(hydrogen) or methacrylate (methyl).

The $C_1$-$C_{18}$ alkyl groups that are optionally substituted by —OH or —$SO_3M$ and that are possible for X are preferably selected from methyl, ethyl, $C_{2-4}$ hydroxyalkyl, $C_{2-4}$Sulfoalkyl, and $C_4$-$C_{18}$ alkyl groups.

The $C_{2-4}$ hydroxyalkyl groups may be selected from ethyl, n-propyl, isopropyl, and n-butyl. The n-butyl, sec-butyl, tert-butyl, pentyl, hexyl, ethylhexyl, octyl, decyl, dodecyl, or stearyl groups can be mentioned as examples of unsubstituted $C_{4-18}$ alkyl groups. Of these, n-butyl and ethylhexyl are particularly suitable. Ethylhexyl is, in particular, 2-ethylhexyl. 2-sulfoethyl and 3-sulfopropyl, in particular, can be mentioned as $C_{2-4}$ sulfoalkyl groups.

In one embodiment of the acrylic acid derivatives, $R_4$ is —$NR_5R_6$, $R_5$ being H and $R_6$ being 2-methyl-propan-2-yl-1-sulfonic acid. In particular, $R_1$, $R_2$, and $R_3$ are hydrogen.

According to one embodiment, $R_4$ is —OX and X is hydrogen. In particular, $R_1$, $R_2$, and $R_3$ are hydrogen (acrylic acid). Alternatively, $R_3$ is methyl (methacrylate). In one embodiment of the acrylic acid derivatives, $R_4$ is —OX and X is methyl. In particular, $R_1$, $R_2$, and $R_3$ are hydrogen (methyl acrylate). According to one embodiment, $R_4$ is —OX and X is 2-ethylhexyl. In particular, $R_1$, $R_2$, and $R_3$ are hydrogen (ethyl acetate). According to one embodiment, $R_4$ is —OX and X is n-butyl. In particular, $R_1$, $R_2$, and $R_3$ are hydrogen (n-butyl acrylate). In one embodiment of the acrylic acid derivatives, $R_4$ is-OX and X is 2-sulfoethyl. In particular, $R_1$, $R_2$, and $R_3$ are hydrogen (sulfoethyl acrylate). In one embodiment of the acrylic acid derivatives, $R_4$ is —OX and X is 3-sulfopropyl. In particular, $R_1$ and $R_2$ are hydrogen and $R_3$ is methyl (sulfopropyl (meth)acrylate).

The polymers or copolymers constructed from monomers of the formula (I) typically satisfy the formula (II):

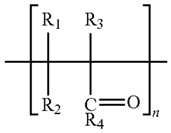

$R_1$-$R_4$ having the above-mentioned meanings and n being an integer of at least 3. n may be, for example, greater than 5, 10, 20, 30, 40, 50, 60, 70, 80, or 100. n may be, for example, less than 10,000, 7,500, 5,000, 2,500, 1,000, or 500. According to one embodiment, n is in the range of from 5 to 5,000. In one embodiment, n is in the range of from 10 to 1,000.

The group of these polymers and copolymers represents a meaningful generalization of the copolymers present in the commercially available emulsion stabilizer "Dimension PA 140".

The emulsion stabilizer is preferably an acrylate copolymer which comprises at least two different monomers of the formula (I). In various embodiments, the copolymer contains AMPS, optionally in combination with (meth)acrylic acid and/or at least one alkyl (meth)acrylate. According to one embodiment, the copolymer contains AMPS and one or more monomers selected from acrylate, methacrylate, methyl acrylate, ethylhexyl acrylate, n-butyl acrylate, N-vinylpyrrolidone, and styrene.

According to one embodiment, the copolymer contains AMPS, acrylate, methyl acrylate, and styrene. According to one embodiment, the copolymer contains AMPS, acrylate, methyl acrylate, and ethyl hexacrylate. According to one embodiment, the copolymer contains AMPS, methyl acrylate, N-vinylpyrrolidone, and styrene. According to one embodiment, the copolymer contains AMPS, acrylate, methyl acrylate, and ethyl hexacrylate. According to one embodiment, the copolymer contains AMPS, methyl acrylate, N-vinylpyrrolidone, and styrene. According to one embodiment, the copolymer contains AMPS, methyl acrylate, and styrene. According to one embodiment, the copolymer contains AMPS, methacrylate, and styrene. According to one embodiment, the copolymer contains AMPS, acrylate, methyl acrylate, and n-butyl acrylate.

According to one embodiment, the emulsion stabilizer is a copolymer as defined in EP0562344B1, which is incorporated by reference herein. According to one embodiment, the emulsion stabilizer is a copolymer containing a) AMPS, sulfoethyl or sulfopropyl (meth)acrylate, or vinylsulfonic acid, in particular in a proportion of 20 to 90%; b) a vinylically unsaturated acid, in particular in a proportion of 0 to 50%; c) methyl or ethyl acrylate or methacrylate, $C_{2-4}$ hydroxyalkyl acrylate, or N-vinylpyrrolidone, in particular in a proportion of 0 to 70%; and d) styrene or $C_{4-18}$ alkyl acrylate or $C_{4-18}$ alkyl methacrylate, in particular in a proportion of 0.1 to 10%.

According to one embodiment, the emulsion stabilizer is a copolymer containing 2-acrylamido-2-methylpropane sulfonic acid, sulfoethyl or sulfopropyl (meth)acrylate, or vinylsulfonic acid, in particular in a proportion of 40 to 75%; b) acrylic acid or methacrylic acid, in particular in a proportion of 10 to 40%; c) methyl or ethyl acrylate or methacrylate, $C_{2-4}$ hydroxyalkyl acrylate, or N-vinylpyrrolidone, in particular in a proportion of 10 to 50%; and d) 0.5 to 5% styrene or $C_{4-18}$ alkyl acrylate or methacrylate, in particular in a proportion of 0.5% to 5%.

According to one embodiment, the emulsion stabilizer is a copolymer containing a) 40 to 75% 2-acrylamido-2-methylpropane sulfonic acid, sulfoethyl or sulfopropyl (meth)acrylate, or vinylsulfonic acid, in particular in a proportion of 40 to 75%; b) acrylic acid or methacrylic acid, 10 to 30%; c) methyl or ethyl acrylate or methacrylate, or N-vinylpyrrolidone, in particular in a proportion of 10 to 50%; and d) styrene or $C_{4-18}$ alkyl acrylate or methacrylate, in particular in a proportion of 0.5% to 5%.

A suitable copolymer is available, for example, under the trade name Dimension PA 140 (Solenis).

The exact determination of the proportion of emulsion stabilizer in the stabilization layer is technically difficult. However, in contrast to the use as a protective colloid during the encapsulation of the core material, it is assumed that a substantial part of the emulsion stabilizer is integrated in the microcapsule shell.

The proportion of the emulsion stabilizer used in the components used for the microencapsulation may be in the range from 0.1 to 15 wt. %. For example, the proportion of the emulsion stabilizer used may be 0.1 wt. %, 0.2 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, or 15 wt. %. Below a concentration of 0.1 wt. %, there is the risk that the surface of the barrier layer is not sufficiently covered with the emulsion stabilizer in order to ensure the desired effect, namely the increase in the amount of the stability layer deposited. Above 15 wt. %, the high concentration of an emulsion stabilizer can hinder the formation of the stability layer. In a preferred embodiment, the emulsion stabilizer is used in a proportion in the components used for the microencapsulation of from 0.25 wt. % to 5 wt. %. In a particularly preferred embodiment, the proportion of the emulsion stabilizer used is in the range of from 0.5 wt. % to 4 wt. %.

Based on the assumption that at least some of the emulsion stabilizer is incorporated in the microcapsule wall, according to one embodiment the proportion of the emulsion stabilizer is in the range of from 0.5 to 15.0 wt. %, based on the total weight of the microcapsule wall. For example, the proportion of the emulsion stabilizer used may be 0.5 wt. %, 1.0 wt. %, 1.5 wt. %, 2.0 wt. %, 2.5 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, or 15 wt. %. In a preferred embodiment, the proportion of the wall-forming components of the microcapsule shell is in the range of from 1 wt. % to 11 wt. %. In a particularly preferred embodiment, the proportion of the emulsion stabilizer used is in the range of from 2 wt. % to 7 wt. %.

The barrier layer preferably contains, as a wall former, one or more components selected from the group consisting of an aldehyde component, an aromatic alcohol, an amine component, and an acrylate component. Preparation methods for preparing microcapsules having these wall materials are known to a person skilled in the art. A polymer selected from a polycondensation product of an aldehyde component comprising one or more aromatic alcohols and/or amine components can be used to produce the barrier layer.

The small wall thickness of the barrier layer can be achieved in particular with a melamine-formaldehyde layer containing aromatic alcohols or m-aminophenol. Consequently, the barrier layer preferably comprises an aldehyde component, an amine component, and an aromatic alcohol.

The use of amine-aldehyde compounds in the barrier layer, in particular melamine formaldehyde, has the advantage that these compounds form a hydrophilic surface with a high proportion of hydroxyl functionality, which thus exhibit a fundamental compatibility with the hydrogen bond-oriented components of the first layer (stability layer), such as biodegradable proteins, polysaccharides, chitosan, lignins, and phosphazenes, but also inorganic wall materials such as $CaCO_3$ and polysiloxanes. Equally, polyacrylates, in particular from the components styrene, vinyl compounds, methyl methacrylate, and 1,4-butanediol acrylate, methacrylic acid, can equally be produced as the microcapsule wall by means of initiation, for example, with t-butyl hydroperoxide in a free-radical induced polymerization (polyacrylates), which polyacrylates form a hydrophilic surface having a high proportion of hydroxyl functionality and which are therefore equally compatible with the components of the stability layer.

In a preferred embodiment, a wall former of the barrier layer is thus an aldehyde component. According to one embodiment, the aldehyde component of the barrier layer is selected from the group consisting of formaldehyde, glutaraldehyde, succinaldehyde, furfural, and glyoxal. All these aldehydes have successfully been used to produce microcapsules (see WO 2013 037 575 A1), and therefore it can be assumed that similarly dense capsules can be obtained with them as with formaldehyde.

For the formation of the wall, the proportion of the aldehyde component can be in the range of from 5 wt. % to 50 wt. % relative to the total weight of the barrier layer. For example, the proportion of the aldehyde component may be 5 wt. %, 6 wt. %, 7 wt. %, 8 wt. %, 9 wt. %, 10 wt. %, or 15 wt. %, 20 wt. %, 25 wt. %, 30 wt. %, 35 wt. %, 40 wt. %, 45 wt. %, or 50 wt. %. It is assumed that, outside these limits, a sufficiently stable and dense, thin layer cannot be obtained. The concentration of the aldehyde component in the barrier layer is preferably in the range of from 10 wt. % to 30 wt. %. Particularly preferably, the concentration of the aldehyde component in the barrier layer is in the range of from 15 wt. % to 20 wt. %.

Suitable amine components in the barrier layer are, in particular, melamine, melamine derivatives, and urea or combinations thereof. Suitable melamine derivatives are etherified melamine derivatives and also methylolated melamine derivatives. Melamine in the methylolated form is preferred. The amine components may be used, for example, in the form of alkylated mono- and polymethylol urea precondensation products or partially methylolated mono- and polymethylol-1,3,5-triamono-2,4,6-triazine precondensation products such as Dimension SD® (from Solenis). According to one embodiment, the amine component is melamine. According to an alternative embodiment, the amine component is a combination of melamine and urea.

The aldehyde component and the amine component may be present in a molar ratio ranging from 1:5 to 3:1. For example, the molar ratio may be 1:5, 1:4.5, 1:4, 1:3.5, 1:3, 1:2.5, 1:2, 1:1.8, 1:1.6, 1:1.4, 1:1.35, 1;1.3, 1:1.2, 1:1, 1.5:1, 2:1, 2.5:1, or 3:1. The molar ratio is preferably in the range of from 1:3 to 2:1. Particularly preferably, the molar ratio of the aldehyde component and the amine component may be in the range of from 1:2 to 1:1. The aldehyde component and the amine component are generally used in a ratio of about 1:1.35. This molar ratio allows for complete reaction of the two reactants and leads to a high degree of tightness of the capsules. For example, aldehyde-amine capsule walls are also known with a molar ratio of 1:2. These capsules have the advantage that the proportion of the high-crosslinking aldehyde, in particular formaldehyde, is very low. However, these capsules have a lower tightness than the capsules with a ratio of 1:1.35. Capsules with a ratio of 2:1 have increased tightness, but have the disadvantage that the aldehyde component is present in partially unreacted form in the capsule wall and in the slurry.

In one embodiment, the proportion of the amine component(s) (for example melamine and/or urea) in the barrier layer is in the range of from 20 wt. % to 85 wt. %, based on the total weight of the barrier layer. For example, the proportion of the amine component may be 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, or 85 wt. %. In a preferred embodiment, the proportion of the amine component in the barrier layer with respect to the total weight of the barrier layer is in the range of from 40 wt. % to 80 wt. %. The proportion of the amine component is particularly preferably in the range of from 55 to 70 wt. %.

By virtue of the aromatic alcohol, it is possible to greatly reduce the wall thickness of the barrier layer composed of the amine component and the aldehyde component, while also obtaining a layer which has the necessary tightness and which is stable enough at least in combination with the stability layer. The aromatic alcohols give the wall increased tightness, since their strongly hydrophobic aromatic structure makes it difficult for substances having a low molecular weight to diffuse through. As shown in the examples, phloroglucinol, resorcinol, or m-aminophenol are particularly suitable as the aromatic alcohol. Consequently, in one embodiment, the aromatic alcohol is selected from the group consisting of phloroglucinol, resorcinol, and aminophenol. In combination with the amine and aldehyde component, the aromatic alcohol is used in a molar ratio to the aldehyde component in the range of from (alcohol:aldehyde) 1:1 to 1:20, preferably in the range of from 1:2 to 1:10.

In one embodiment, the proportion of the aromatic alcohol in the barrier layer relative to the total weight of the barrier layer is in the range of from 1.0 wt. % to 20 wt. %. For example, the proportion of the aromatic alcohol may be 1.5 wt. %, 2.0 wt. %, 2.5 wt. %, 3.0 wt. %, 4.0 wt. %, 5.0 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, or 20 wt. %. Owing to their aromatic structure, the aromatic alcohols give the capsule wall a coloring which increases with the proportion of the aromatic alcohol. Such a coloring is undesirable in many applications. In addition, the aromatic alcohols are susceptible to oxidation, which leads to a change in the coloring over time. As a result, the undesired coloration of the microcapsules can be poorly compensated with a dye. Therefore, the aromatic alcohols should not be used above 20.0 wt. %. Below 1.0 wt. %, no effect is detectable with respect to the tightness. In a preferred embodiment, the proportion of the aromatic alcohol in the barrier layer relative to the total weight of the barrier layer is in the range of from 5.0 wt. % to 15.0 wt. %. Up to a percentage of 15.0 wt. %, coloration is tolerable in most applications. In a particularly preferred embodiment, the proportion of the aromatic alcohol in the barrier layer with respect to the total weight of the barrier layer is in the range of from 6 wt. % to 16.0 wt. %. In particular, the proportion of the aromatic alcohol in the barrier layer is in the range of from 10 wt. % to 14.0 wt. %.

In another embodiment, the aldehyde component of the barrier layer can be used together with an aromatic alcohol such as resorcinol, phloroglucinol, or m-sminophenol as the wall-forming component(s), i.e. without the amine component(s).

In one embodiment, the barrier layer comprises melamine, formaldehyde, and resorcinol. In one embodiment, the barrier layer of the microcapsules comprises melamine, urea, formaldehyde, and resorcinol. In a preferred embodiment, the barrier layer contains melamine in the range of from 25 to 40 wt. %, formaldehyde in the range of from 15 to 20 wt. %, and resorcinol in the range of from 10 to 14 wt. %, and optionally urea in the range of from 25 to 35 wt. %. The proportions refer to the amounts used for the formation of the wall of the layer and are based on the total weight of the barrier layer without a protective colloid.

To encapsulate the core material with the barrier layer consisting of an aldehyde component, an amine component, and an aromatic alcohol, an emulsion stabilizer is preferably used as the protective colloid, as mentioned above. The emulsion stabilizer used as a protective colloid may be a polymer or copolymer as defined above as a mediator agent. For example, the protective colloid is a copolymer containing AMPS (Dimension® PA 140, Solenis) or the salts thereof. In one embodiment, the same copolymer is used as the protective colloid and as the mediator agent.

Suitable amine components in the barrier layer are, in particular, melamine, melamine derivatives, and urea or combinations thereof. Suitable melamine derivatives are etherified melamine derivatives and also methylolated melamine derivatives. Melamine in the methylolated form is preferred. The amine components may be used, for example, in the form of alkylated mono- and polymethylol urea precondensation products or partially methylolated mono- and polymethylol-1,3,5-triamono-2,4,6-triazine precondensation products such as Dimension SD® (from Solenis). According to one embodiment, the amine component is melamine. According to an alternative embodiment, the amine component is a combination of melamine and urea.

The stability layer forms the majority of the microcapsule shell and thus ensures a high biodegradability of at least 40% within 60 days according to OECD 301 F. Biopolymers suitable for the stability layer are proteins such as gelatin, whey protein, plant storage protein; polysaccharides such as alginate, gum arabic, modified gum, chitin, dextran, dextrin, pectin, cellulose, modified cellulose, hemicellulose, starch, or modified starch; phenolic macromolecules such as lignin; polyglucosamines such as chitosan; polyvinyl esters such as polyvinyl alcohols and polyvinyl acetate; phosphazenes and polyesters such as polylactide or polyhydroxyalkanoate. This enumeration of the specific components in the individual substance classes is merely exemplary and is not to be understood as limiting. Suitable natural wall formers are known to a person skilled in the art. Furthermore, the various methods for wall formation, for example coacervation or interfacial polymerization, are known to a person skilled in the art.

The biopolymers can be selected accordingly for the relevant application in order to form a stable multilayer shell with the material of the stability layer. In addition, the biopolymers can be selected to achieve compatibility with the chemical conditions of the field of application. The biopolymers can be combined as desired in order to influence the biodegradability or, for example, the stability and chemical resistance of the microcapsule.

In one embodiment of the first aspect, the shell of the microcapsules has a biodegradability of 50% according to OECD 301 F. In another embodiment, the shell of the microcapsule has a biodegradability of at least 60% (OECD 301 F). In another embodiment, the biodegradability is at least 70% (OECD 301 F). Biodegradability is measured in each case over a period of 60 days. In the extended degradation method ("enhanced ready biodegradation"), the biodegradability is measured over a period of 60 days (see Opinion on an Annex XV dossier proposing restrictions on intentionally-added microplastics of Jun. 11, 2020 ECHA/RAC/RES-O-0000006790-71-01/F)). Preferably, the microcapsules are freed from residues by means of washing prior to the determination of the biodegradability. Particularly preferably, copies of the microcapsules are produced for this test with an inert, non-biodegradable core material such as perfluorooctane (PFO) instead of the perfume oil. In one embodiment, after being prepared, the capsule dispersion is washed by centrifugation and redispersion in distilled water three times. For this purpose, the sample is centrifuged (e.g. for 10 min at 12,000 RPM). After the clear supernatant has been vacuumed off, water is added and the sediment is redispersed by means of shaking. In the measurement of biodegradability, various reference samples can be used, such as the rapidly degradable ethylene glycol or natural-based walnut shell flour with the typical step-like degradation of a complex substance mixture. The microcapsule exhibits a similar, preferably better biodegradability over a period of 28 or 60 days than the walnut shell flour.

Residues in the microcapsule dispersions are substances which are used in the preparation of the microcapsules and are in non-covalent interaction with the shell, such as deposition aids, preservatives, emulsifiers/protective colloids, or excess feedstocks. These residues have a proven influence on the biodegradability of microcapsule dispersions. For this reason, washing is necessary before determining the biodegradability.

In order to get an impression of the proportion of covalently bonded and non-covalently bonded constituents in the microcapsule dispersion, the capsules were investigated by means of the quantification method described in Gasparini et al. 2020 on the basis of Py-GC-MS for polymer-encapsulated fragrances. This method includes a multistage purification protocol for polymers of complex samples such as microcapsule dispersions, and makes it possible to quantify volatile residual constituents suspected of not being covalently incorporated into the 3D polymer network and therefore not being quantifiable by other standard methods (e.g. SPME-GC-MS or TGA). Based on this method, it was confirmed that individual layers of the microcapsule, in particular the barrier layer and the stability layer, can be inseparably connected and regarded as a monopolymer. It can be assumed that, by adding the emulsion stabilizer, not only the structural accommodation of the stability layer by the barrier layer is improved, but additionally the structural (covalent) bonding of all wall-forming components is increased.

A high degree of biodegradability is achieved not only by the wall formers used, but also by the structure of the shell. This is because the use of a particular percentage of biopolymers does not automatically lead to a corresponding value of the biodegradability. This is dependent on how the biopolymers are present in the shell.

According to a preferred embodiment, the stability layer contains gelatin as the biopolymer. According to another preferred embodiment, the stability layer contains alginate as the biopolymer. According to another preferred embodiment, the stability layer contains gelatin and alginate as biopolymers. Both gelatin and alginate are suitable for the preparation of microcapsules having high biodegradability and high stability. In particular in the case of a stability layer containing gelatin and alginate, the treatment of the surface of the barrier layer with an emulsion stabilizer, in particular an AMPS-containing copolymer, can lead to a significant increase in the layer thickness of the stability layer. Further suitable combinations of natural components in the first layer (stability layer) are gelatin and gum arabic.

The stability layer contains one or more curing agents. Suitable curing agents are aldehydes such as glutaraldehyde, formaldehyde, glyoxal, tannins, enzymes such as transglutaminase, organic anhydrides such as maleic anhydride, epoxy compounds, polyvalent metal cations, amines, polyphenols, maleimides, sulfides, phenol oxides, hydrazides, isocyanates, isothiocyanates, N-hydroxysulfosuccinimide derivatives, carbodiimide derivatives, and polyols. The curing agent is preferably glutaraldehyde due to its very good crosslinking properties. The curing agent glyoxal is also preferred due to its good crosslinking properties and, compared with glutaraldehyde, lower toxicological classification. The use of curing agents produces a higher tightness of the stability layer. However, curing agents lead to reduced biodegradability of the natural polymers.

Due to the presence of the barrier layer as a diffusion barrier, the amount of curing agent in the stability layer can be kept low, which in turn contributes to the easy biodegradability of the layer. According to one embodiment, the proportion of the curing agent in the stability layer is below 25 wt. %. Unless explicitly defined otherwise, the proportions of the constituents of the layers are based on the total weight of the layer, i.e. the total dry weight of the constituents used for preparation, without taking into account the constituents used during preparation, which are not incorporated or only slightly incorporated into the layer, for example surfactants and protective colloids. Above this value, the biodegradability according to OECD 301 F cannot be ensured. The proportion of the curing agent in the stability layer may be, for example, 1.0 wt. %, 2.0 wt. %, 3.0 wt. %, 4.0 wt. %, 5.0 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, or 24 wt. %. The proportion of the curing agent in the stability layer is preferably in the range of from 1 to 15 wt. %. This proportion leads to effective crosslinking of the gelatin and, in a quantitative reaction, results in as little residual monomer as possible being formed. The range 9 to 12 wt. % is particularly preferred, since it ensures the required degree of crosslinking as well as a stable envelope for the barrier layer in order to buffer the otherwise sensitive barrier layer, and has only little residual aldehyde, which is degraded in a downstream alkaline setting of the slurry by means of an aldol reaction.

In one embodiment, the stability layer contains gelatin and glutaraldehyde. According to another embodiment, the stability layer contains gelatin, alginate, and glutaraldehyde. In an additional embodiment, the stability layer contains gelatin and glyoxal. According to another embodiment, the stability layer contains gelatin, alginate, and glyoxal. The exact chemical composition of the stability layer is not crucial. However, the desired effect is preferably achieved with polar biopolymers.

According to a preferred embodiment, the microcapsule shells do not contain titanium oxide. According to another preferred embodiment, the microcapsule shells do not contain metal oxide. According to a likewise preferred embodiment, the microcapsule shells do not contain a pigment. According to an additional embodiment, the microcapsule shells do not contain dye.

The use of the emulsion stabilizer on the surface of the barrier layer significantly increases the mean thickness of the stability layer. The mean thickness of the stability layer is at least 1 μm. The mean thickness of the stability layer may be 1 μm, 1.2 μm, 1.4 μm, 1.6 μm, 1.8 μm, 2 μm, 2.2 μm, 2.4 μm, 2.6 μm, 2.8 μm, 3 μm, 3.5 μm, 4 μm, 4.5 μm, 5 μm, 5.5 μm, 6 μm, 6.5 μm, 7 μm, 7.5 μm, 8 μm, 8.5 μm, 9 μm, 9.5 μm, or 10 μm. The stability layer frequently has an elliptical shape in cross section, and therefore the thickness of the stability layer varies over the microcapsule surface. Therefore, a mean thickness of the microcapsules is calculated. In addition, the deposition varies from microcapsule to microcapsule. This is taken into account in that the mean thicknesses of several microcapsules are determined and the average is calculated therefrom. Thus, the mean thickness mentioned here is, strictly speaking, an average mean thickness. The layer thickness of the stability layer can be determined in two ways. Firstly, there is the light microscopic approach, i.e. the direct optical measurement of the observed layer thickness by means of a microscope and corresponding software. In this case, a large number of microcapsules of a dispersion are measured and the minimum diameter of each individual microcapsule is determined based on the variation within the capsules.

A second possibility is the measurement of the particle size distribution by means of laser diffraction. Here, the modal value of a particle size distribution of the without the layer to be measured can be compared with the modal value of a particle size distribution with the layer to be measured. The increase in this modal value reflects the increase in the hydrodynamic diameter of the major fraction on measured microcapsules. The formation of the difference from the two measured modal values ultimately results in twice the layer thickness of the layer.

According to a preferred embodiment, the mean thickness of the stability layer is at least 2 μm. By choosing a suitable combination of emulsion stabilizer and wall former for the stability layer, stability layers having a mean thickness of 6 μm or more can be formed. In a particularly preferred embodiment, the mean thickness of the stability layer is at least 3 μm.

In contrast to other biodegradable microcapsules, the microcapsules described herein have a high degree of tightness. According to one embodiment, the microcapsules have a tightness which ensures egress of at most 50 wt. % of the core material used after storage over a period of 4 weeks at a temperature of 0 to 40° C.

The tightness of the capsule wall can be influenced by the choice of the shell components. According to one embodiment, the microcapsules have a tightness which ensures egress of at most 45 wt. %, at most 40 wt. %, at most 35 wt. %, at most 30 wt. %, at most 25 wt. %, at most 20 wt. % of the core material used during storage over a period of 4 weeks at a temperature of 0 to 40° C. The microcapsules are stored in a model formulation corresponding to the target application. Moreover, the microcapsules are also storage-stable in the product in which they are used. For example, in detergents, fabric softeners, or cosmetic products. The guideline formulations for these products are known to a person skilled in the art. Typically, the pH in the environment of the microcapsules is in the range of from 2 to 12 during storage.

The microcapsule shells have at least two layers, i.e. they may be, for example, two-layer, three-layer, four-layer, or five-layer. The microcapsules are preferably two- or three-layer.

According to one embodiment, the microcapsule has a third layer which is arranged on the outer side of the stability layer. This third layer can be used to adapt the surface properties of the microcapsule for a particular application. These include an improvement of the adhesion of the microcapsules to a wide variety of surfaces and a reduction of the agglomeration. The third layer also binds residual quantities of aldehyde, thus reducing the content of free aldehydes in the capsule dispersion. Furthermore, it can provide additional (mechanical) stability or further increase the tightness. Depending on the application, the third layer may contain a component selected from amines, organic salts, inorganic salts, alcohols, ethers, polyphosphazenes, and noble metals.

Noble metals increase the tightness of the capsules and can give the microcapsule surface additional catalytic properties or the antibacterial action of a silver layer. Organic salts, in particular ammonium salts, lead to cationization of the microcapsule surface, which results in the microcapsule surface adhering better to textiles, for example. Alcohols also lead to the formation of H bridges when integrated via free hydroxyl groups, which also allow for better adhesion to substrates. An additional polyphosphazene layer or a coating of inorganic salts, for example silicates, leads to an additional increase in the tightness without affecting the biodegradability. According to a preferred embodiment, the third layer contains activated melamine. The melamine absorbs possible free aldehyde fractions of the stability and/or barrier layer, increases the tightness and stability of the capsule, and can additionally influence the surface properties of the microcapsules and thus the adhesion and agglomeration behavior.

Due to the small wall thicknesses, the proportion of the barrier layer in the shell relative to the total weight of the shell is at most 30 wt. %. The proportion of the barrier layer in the shell relative to the total weight of the shell may, for example, be 30 wt. %, 28 wt. %, 25 wt. %, 23 wt. %, 20 wt. %, 18 wt. %, 15 wt. %, 13 wt. %, 10 wt. %, 8 wt. %, or 5 wt. %. For a high biodegradability, the proportion is at most 25 wt. % relative to the total weight of the shell. Particularly preferably, the proportion of the barrier layer is at most 20 wt. %. The proportion of the stability layer in the shell relative to the total weight of the shell is at least 40 wt. %. The proportion of the stability layer in the shell relative to the total weight of the shell may, for example, be 40 wt. %, 43 wt. %, 45 wt. %, 48 wt. %, 50 wt. %, 53 wt. %, 55 wt. %, 58 wt. %, 60 wt. %, 63 wt. %, 65 wt. %, 68 wt. %, 70 wt. %, 75 wt. %, 80 wt. %, 85 wt. %, or 90 wt. %. For a high biodegradability, the proportion of the stability layer is at least 50 wt. %, particularly preferably at least 60 wt. %. The proportion of the third layer in the shell relative to the total weight of the shell is at most 35 wt. %. The proportion of the third layer in the shell relative to the total weight of the shell may, for example, be 35 wt. %, 33 wt. %, 30 wt. %, 28 wt. %, 25 wt. %, 23 wt. %, 20 wt. %, 18 wt. %, 15 wt. %, 13 wt. %, 10 wt. %, 8 wt. %, or 5 wt. %. For a high biodegradability, the proportion of the third layer is at most 30 wt. %, particularly preferably at most 25 wt. %.

The size of the microcapsules is in the range customary for microcapsules. The diameter may be in the range of from 100 nm to 1 mm. The diameter is dependent on the exact capsule composition and the preparation method. The peak maximum of the particle size distribution is regularly used as the characteristic value for the size of the capsules. The peak maximum of the particle size distribution is preferably in the range of from 1 μm to 500 μm. The peak maximum of the particle size distribution may, for example, be 1 μm, 2 μm, 3 μm, 4 μm, 5 μm, 10 μm, 15 μm, 20 μm, 30 μm, 40 μm, 50 μm, 60 μm, 70 μm, 80 μm, 90 μm, 100 μm, 120 μm, 140 μm, 160 μm, 180 μm, 200 μm, 250 μm, 300 μm, 350 μm, 400 μm, 450 μm, or 500 μm. According to a particularly preferred embodiment, the microcapsules have a peak maximum of the particle size distribution of 10 μm to 100 μm. In particular, the peak maximum of the particle size distribution is in the range of from 10 μm to 50 μm.

The use of the emulsion stabilizer for coating the barrier layer constitutes a novel application that should be distinguished from the conventional use of the emulsion stabilizer, namely the stabilization of the core material droplets.

In addition to the shell material, the tightness is also dependent on the type of core material. A large number of different materials are suitable as the core material, inter alia fragrances and cosmetic active ingredients. According to a preferred embodiment of the microcapsules, the core material is hydrophobic. The core material may be solid or liquid. In particular, it is liquid. It is preferably a liquid hydrophobic core material. In a preferred embodiment, the core material is a fragrance or the core material comprises at least one fragrance. Particularly preferably, the core material consists of fragrance oils or perfume oils that are optimized for microencapsulation for the field of detergents and cleaning agents, for example the fragrance formulation Weiroclean (from Kurt Kitzing GmbH). The fragrances can be used in the form of a solid or liquid formulation, but in particular in liquid form.

Fragrance compounds of the ester type are, for example, benzyl acetate, phenoxyethyl isobutyrate, p-tert butylcyclohexyl acetate, linalyl acetate, dimethylbenzyl carbinyl acetate (DMBCA), phenylethyl acetate, benzyl acetate, ethylmethylphenyl glycinate, allyl cyclohexyl propionate, styrallyl propionate, benzyl salicylate, cyclohexyl salicylate, floramate, melusate, and jasmacyclate. The ethers include, for example, benzyl ethyl ether and ambroxan, the aldehydes mentioned above include, for example, linear alkanals having 8 to 18 C atoms, citral, citronellal, citronellyl oxyacetaldehyde, cyclamen aldehyde (3-(4-propan-2-ylphenyl) butanal), lilial, and bourgeonal, the ketones include, for example, ionones, [alpha]-isomethylionone, and methyl cedryl ketone, the alcohols include anethole, citronellol, eugenol, geraniol, linalool, phenylethyl alcohol, and terpineol, and the hydrocarbons include, mainly, terpenes such as limonene and pinene. Preferably, however, mixtures of different fragrances are used which together produce an appealing scent.

Suitable aromatic aldehydes may be selected from adoxal (2,6,10-trimethyl-9-undecenal), anisaldehyde (4-methoxybenzaldehyde), cymal or cyclamen aldehyde (3-(4-isopropylphenyl)-2-methylpropanal), nympheal (3-(4-isobutyl-2-methylphenyl) propanal), ethyl vanillin, florhydral (3-(3-isopropylphenyl) butanal]), trifernal (3-phenylbutyraldehyde), helional (3-(3,4-methylenedioxyphenyl)-2-methylpropanal), heliotropin, hydroxycitronellal, lauraldehyde, lyral (3- and 4-(4-hydroxy-4-methylpentyl)-3-cyclohexene-1-carboxaldehyde), methyl nonyl acetaldehyde, lilial (3-(4-tert-butylphenyl)-2-methylpropanal), phenyl acetaldehyde, undecylenic aldehyde, vanillin, 2,6,10-trimethyl-9-undecenal, 3-dodecen-1-al, alpha-n-amyl cinnamic aldehyde, melonal (2,6-dimethyl-5-heptenal), triplal (2,4-dimethyl-3-cyclohexene-1-carboxaldehyde), 4-methoxybenzaldehyde, benzaldehyde, 3-(4-tert-butylphenyl) propanal, 2-methyl-3-(paramethoxyphenyl) propanal, 2-methyl-4-(2,6,6-timethyl-2 (1)-cyclohexene-1-yl) butanal, 3-phenyl-2-propenal, cis-/trans-3,7-dimethyl-2,6-octadien-1-al, 3,7-dimethyl-6-octen-1-al, [(3,7-dimethyl-6-octenyl) oxy]acetaldehyde, 4-isopropylbenzylaldehyde, 1,2,3,4,5,6,7,8-octahydro-8,8-dimethyl-2-naphthaldehyde, 2,4-dimethyl-3-cyclohexen-1-carboxaldehyde, 2-methyl-3-(isopropylphenyl) propanal, 1-decanal, 2,6-dimethyl-5-heptenal, 4-(tricyclo[5.2.1.0 (2,6)]-decylidene-8)-butanal, octahydro-4,7-methano-1H-indene carboxaldehyde, 3-ethoxy-4-hydroxybenzaldehyde, para-ethyl-alpha, alpha-dimethyl hydrocinnamic aldehyde, alpha-methyl-3,4-(methylenedioxy)-hydrocinnamic aldehyde, 3,4-methylenedioxybenzaldehyde, alpha-n-hexyl cinnamic aldehyde, m-cymene-7-carboxaldehyde, alpha-methyl phenyl acetaldehyde, tetrahydrocitral (3,7-dimethyloctanal), undecenal, 2,4,6-trimethyl-3-cyclohexene-1-carboxaldehyde, 4-(3) (4-methyl-3-pentenyl)-3-cyclohexene carboxaldehyde, 1-dodecanal, 2,4-dimethylcyclohexene-7-3-carboxaldehyde, 4-(4-hydroxy-4-methylpentyl)-3-cylohexene-1-carboxaldehyde, methoxy-3,7-dimethyloctan-1-al, 2-methyldecanal, 1-nonanal, 1-octanal, 2,6,10-trimethyl-5,9-undecadienal, 2-methyl-3-(4-tert-butyl) propanal, dihydrocinnamic aldehyde, 1-methyl-4-(4-methyl-3-pentenyl)-3-cyclohexene-1-carboxaldehyde, 5- or 6-methoxy-hexahydro-4,7-methanindan-1- or -2-carboxaldehyde, 3,7-dimethyloctan-1-al, 1-undecanal, 10-undecen-1-al, 4-hydroxy-3-methoxybenzaldehyde, 1-methyl-3-(4-methylpentyl)-3-cyclohexene carboxaldehyde, 7-hydroxy-3,7-dimethyloctanal, trans-4-decenal, 2,6-nonadienal, para-tolyl acetaldehyde, 4-methylphenylacetaldehyde, 2-methyl-4-(2,6,6-trimethyl-1-cyclohexen-1-yl)-2-butenal, ortho-methoxy cinnamic aldehyde, 3,5,6-trimethyl-3-cyclohexene carboxaldehyde, 3,7-dimethyl-2-methylene-6-octenal, phenoxyacetaldehyde, 5,9-dimethyl-4,8-decadienal, peony aldehyde (6,10-dimethyl-3-oxa-5,9-undecadien-1-al), hexahydro-4,7-methanindan-1-carboxaldehyde, 2-methyloctanal, alpha-methyl-4-(1-methylethyl)benzene acetaldehyde, 6,6-dimethyl-2-norpinen-2-propionaldehyde, para-methyl phenoxy acetaldehyde, 2-methyl-3-phenyl-2-propen-1-al, 3,5,5-trimethylhexanal, hexahydro-8,8-dimethyl-2-naphthaldehyde, 3-propylbicyclo[2.2.1]-hept-5-ene-2-carbaldehyde, 9-decenal, 3-methyl-5-phenyl-1-pentanal, floral (4,8-dimethyl-4,9-decadienal), aldehyde $C_{12}$MNA (2-methylundecanal), liminal (beta-4-dimethylcyclohex-3-ene-1-propan-1-al), methyl nonyl acetaldehyde, hexanal, trans-2-hexenal, and mixtures thereof.

Suitable aromatic ketones include, but are not limited to, methyl beta-naphthyl ketone, musk indanone (1,2,3,5,6,7-hexahydro-1,1,2,3,3-pentamethyl-4H-inden-4-one), calone (methylbenzodioxepinone), tonalid (6-acetyl-1,1,2,4,4,7-hexamethyltetraline), alpha-damascone, beta-damascone, delta-damascone, iso-damascone, damascenone, methyl dihydrojasmonate (hedione), menthone, carvone, camphor, koavone (3,4,5,6,6-pentamethylhept-3-en-2-one), fenchone, alpha-ionone, beta-ionone, dihydro-beta-ionone, gamma-methyl ionone, fleuramone (2-heptylcyclopentanone), frambinone methyl ether (4-(4-methoxyphenyl) butan-2-one), dihydrojasmone, cis-jasmone, 1-(1,2,3,4,5,6,7,8-octahydro-2,3,8,8-tetramethyl-2-naphthalenyl)-ethan-1-one and isomers thereof, methyl cedrenyl ketone, acetophenone, methyl acetophenone, para-methoxy acetophenone, methyl beta-naphthyl ketone, benzylacetone, benzophenone, para-hydroxyphenyl butanone, celery ketone (3-methyl-5-propyl-2-cyclohexenone), 6-isopropyldecahydro-2-naphtone, dimethyl octenone, frescomenthe (2-butan-2-ylcyclohexan-1-one), 4-(1-ethoxyvinyl)-3,3,5,5-tetramethylcyclohexanone, methyl heptenone, 2-(2-(4-methyl-3-cyclohexen-1-yl)propyl)cyclopentanone, 1-(p-menthen-6 (2) yl)-1-propanone, 4-(4-hydroxy-3-methoxyphenyl)-2-butanone, 2-acetyl-3,3-dimethylnorbornane, 6,7-dihydro-1,1,2,3,3-pentamethyl-4

(5H) indanone, 4-damascol, dulcinyl (4-(1,3-benzodioxol-5-yl) butan-2-one), hexalone (1-(2,6,6-trimethyl-2-cyclohexen-1-yl)-1,6-heptadien-3-one), isocyclemone E (2-acetonaphthone-1,2,3,4,5,6,7,8-octahydro-2,3,8,8-tetramethyl), methyl nonyl ketone, methyl cyclocitrone, methyl lavender ketone, orivone (4-tert-amylcyclohexanone), 4-tert-butylcyclohexanone, delphone (2-pentylcyclopentanone), muscone (CAS 541-91-3), neobutenone (1-(5,5-dimethyl-1-cyclohexenyl) pent-4-en-1-one), plicatone (CAS 41724-19-0), veloutone (2,2,5-trimethyl-5-pentylcyclopentan-1-one), 2,4,4,7-tetramethyloct-6-en-3-one, tetrameran (6,10-dimethylundecen-2-one), and mixtures thereof.

The core materials may also contain natural fragrance mixtures, such as those that can be obtained from plant sources, for example pine, citrus, jasmine, patchouli, rose, or ylang-ylang oil. Equally, clary sage oil, chamomile oil, clove oil, melissa oil, mint oil, cinnamon leaf oil, lime blossom oil, juniper berry oil, vetiver oil, olibanum oil, *galbanum* oil, and labdanum oil, as well as orange blossom oil, neroli oil, orange peel oil, and sandalwood oil are also suitable.

Further conventional fragrances, which may be contained in the microcapsules, are, for example, essential oils such as *angelica* root oil, anise oil, *arnica* blossom oil, basil oil, bay oil, champaca blossom oil, noble fir oil, noble fir cone oil, elemi oil, *eucalyptus* oil, fennel oil, spruce needle oil, *galbanum* oil, geranium oil, ginger grass oil, guiac wood oil, gurjun balsam oil, helichrysum oil, ho oil, ginger oil, iris oil, cajeput oil, calamus oil, camomile oil, camphor oil, canaga oil, cardamom oil, *cassia* oil, pine needle oil, copaiba balsam oil, coriander oil, spearmint oil, caraway seed oil, cumin oil, lavender oil, lemongrass oil, lime oil, mandarin oil, melissa oil, musk seed oil, myrrh oil, clove oil, neroli oil, niaouli oil, olibanum oil, *origanum* oil, palmarosa oil, patchouli oil, perubalsam oil, petitgrain oil, pepper oil, peppermint oil, allspice oil, pine oil, rose oil, rosemary oil, sandalwood oil, celery oil, spike oil, star anise oil, turpentine oil, *thuja* oil, thyme oil, *verbena* oil, vetiver oil, juniper berry oil, wormwood oil, wntergreen oil, ylang-ylang oil, hyssop oil, cinnamon oil, cinnamon leaf oil, citronella oil, lemon oil as well as cypress oil as well as ambrettolide, ambroxan, α-amyl cinnamaldehyde, anethol, anisaldehyde, anisic alcohol, anisole, anthranilic acid methyl ester, acetophenone, benzylacetone, benzaldehyde, benzoic acid ethyl ester, benzophenone, benzyl alcohol, benzyl acetate, benzyl benzoate, benzyl formate, benzyl valerate, borneol, bornyl acetate, boisambrene forte, α-bromostyrene, n-decyl aldehyde, n-dodecyl aldehyde, eugenol, eugenol methyl ether, eucalyptol, farnesol, fenchone, fenchyl acetate, geranyl acetate, geranyl formate, heliotropin, heptincarboxylic acid methyl ester, heptaldehyde, hydroquinone dimethyl ether, hydroxycinnamaldehyde, hydroxycinnamic alcohol, indole, iran, isoeugenol, isoeugenol methyl ether, isosafrol, jasmone, camphor, carvacrol, carvone, p-cresol methyl ether, coumarin, p-methoxyacetophenone, methyl n-amyl ketone, methyl anthranilic acid methyl ester, p-methyl acetophenone, methyl chavicol, p-methyl quinoline, methyl-β-naphthyl ketone, methyl-n-nonyl acetaldehyde, methyl-n-nonyl ketone, muscone, β-naphthol ethyl ether, β-naphthol methyl ether, nerol, n-nonyl aldehyde, nonyl alcohol, n-octyl aldehyde, p-oxy acetophenone, pentadecanolide, β-phenylethyl alcohol, phenylacetic acid, pulegone, safrole, salicylic acid isoamyl ester, salicylic acid methyl ester, salicylic acid hexyl ester, salicylic acid cyclohexyl ester, santalol, sandelice, skatole, terpineol, thymene, thymol, troenan, γ-undelactone, vanillin, veratrum aldehyde, cinnamaldehyde, cinnamic alcohol, cinnamic acid, cinnamic acid ethyl ester, cinnamic acid benzyl ester, diphenyl oxide, limonene, linalool, linalyl acetate and propionate, melusate, menthol, menthone, methyl-n-heptenone, pinene, phenylacetaldehyde, terpinyl acetate, citral, citronellal, and mixtures thereof.

According to an embodiment, it is particularly preferred if perfume compositions which, based on the total weight of all odorants contained in the encapsulated perfume composition comprise the following, are encapsulated in the described microcapsules:

a) ≤10 wt. %, preferably ≤8 wt. %, of odorants having a CLogP of ≤2.5 and a boiling point of ≥200° C.;
b) ≥15 wt. %, preferably ≥20 wt. %, of at least one odorant having a CLogP of ≥4.0 and a boiling point of ≤275° C.; and
c) ≥30 wt. %, preferably ≥40 wt. %, of at least one odorant having a vapor pressure of ≥5 Pa at 20° C.

The CLogP value is the liquid-liquid partition coefficient for the n-octanol-water system and a measure of the ratio between the lipophilicity and hydrophilicity of a substance. A value of greater than 1 denotes a rather lipophilic substance, a value below 1 denotes a substance which is more soluble in water than in n-octanol. The ClogP value can be calculated for any substance using suitable programs that are commercially available. Unless stated otherwise, the values specified herein are determined using the program EPI SUITE™ (v4.11) with the module KOWWIN™ v1.68.

Unless stated otherwise, the boiling point was determined using the program EPI SUITE™ (v 4.11) with the module MPBPWIN v.1.43 (adapted Stein and Brown Method).

Unless stated otherwise, the vapor pressure at 20° C. was determined using the program EPI SUITE™ (v4.11) with the module MPBPWIN v.1.43 (modified grain method).

Examples of the fragrances of group a) include, but are not limited to:

| Odorant | CAS Number | CLogP | Boiling point [° C.] |
|---|---|---|---|
| Dulcinyl | 55418-52-5 | 2.03 | 295.74 |
| Furanol methyl ether | 4077-47-8 | 0.62 | 214.32 |
| Methyl corylone | 13494-06-9 | −0.12 | 219.34 |
| Tonkanyle ii | 874-90-8 | 1.62 | 230.92 |
| 2-Amino-1,3-propanediol serinol | 534-03-2 | −1.55 | 216.16 |
| 2.3-Diethyl pyrazine | 15707-24-1 | 2.02 | 209.41 |
| 3-(Methylthio)-1-hexanol | 51755-66-9 | 1.84 | 225.06 |
| Acetanisole | 100-06-1 | 1.75 | 229.45 |
| Acetate pa | 7493-74-5 | 2.46 | 268.49 |
| Aldehyde c 18 sog | 104-61-0 | 2.08 | 265.5 |
| Allyl amyl glycolate | 67634-00-8 | 2.34 | 217.66 |
| Anisaldehyde | 123-11-5 | 1.79 | 221.63 |
| Anisyl acetate | 104-21-2 | 2.16 | 252.81 |
| Benzyl acetate | 140-11-4 | 2.08 | 215.57 |
| Benzyl acetone | 2550-26-7 | 1.96 | 228.74 |
| Benzyl alcohol | 100-51-6 | 1.08 | 205.65 |
| Bicyclononalactone | 4430-31-3 | 1.55 | 271.33 |
| Birolan | 25322-68-3 | −2.3 | 353.51 |
| Buccoxime | 75147-23-8 | 2.2 | 264.34 |
| Calone | 28940-11-6 | 2.43 | 296.5 |
| Corps eglantine | 64988-06-3 | 2.35 | 231.03 |
| Corylone | 80-71-7 | 1.29 | 241.48 |
| Coumarin | 91-64-5 | 1.51 | 290.74 |
| Dmbc | 100-86-7 | 2.44 | 228.78 |
| Ethyl fruitate | 6413-10-1 | 1.3 | 217.74 |
| Ethyl maltol | 4940-11-8 | 0.3 | 283.37 |
| Ethyl vanillin | 121-32-4 | 1.55 | 290.04 |
| Florol | 63500-71-0 | 2.16 | 229.55 |
| Frambinone methyl ether | 104-20-1 | 2.04 | 264.7 |
| Guaiacol | 90-05-1 | 1.34 | 211.43 |
| Heliotropin | 120-57-0 | 1.77 | 256.96 |
| Homofuronol | 27538-09-6 | 1.31 | 275.21 |
| Hydratropic ald. dim. acetal | 90-87-9 | 2.35 | 227.23 |
| Hydratropic aldehyde | 93-53-8 | 1.96 | 209.32 |

-continued

| Odorant | CAS Number | CLogP | Boiling point [° C.] |
|---|---|---|---|
| Hydroxycitronellal pure | 107-75-5 | 2.11 | 241.19 |
| Hydrocinnamic alcohol | 122-97-4 | 2.06 | 243.15 |
| Indocolore | 2206-94-2 | 2.49 | 227.9 |
| Indoflor | 18096-62-3 | 1.84 | 264.36 |
| Indole | 120-72-9 | 2.05 | 250.04 |
| Isobutavan | 20665-85-4 | 2.3 | 314.04 |
| Koumalactone | 92015-65-1 | 1.89 | 276.66 |
| Cresyl acetate (para) | 140-39-6 | 1.14 | 215.56 |
| Liffarome | 67633-96-9 | 2.47 | 213 |
| Linalool oxide | 1365-19-1 | 2.08 | 232.9 |
| Maltol | 118-71-8 | −0.19 | 267.24 |
| Malyl isobutyrate | 65416-14-0 | 1.7 | 286.06 |
| Menoxaline | 13708-12-8 | 1.66 | 265.62 |
| Methoxymelonal | 62439-41-2 | 2.32 | 205.16 |
| Methyl cinnamic alcohol | 1504-55-8 | 2.39 | 261.14 |
| Methyl diantilis | 5595-79-9 | 1.61 | 282.35 |
| Methyl octalactone | 39212-23-2 | 2 | 260.63 |
| Methyl acetophenone para | 122-00-9 | 2.22 | 209.72 |
| Methyl anthranilate | 134-20-3 | 2.26 | 263.57 |
| Methyl cinnamate | 103-26-4 | 2.36 | 239.9 |
| Methyl phenylacetate | 101-41-7 | 2.08 | 215.57 |
| Methyl serinol | 115-69-5 | −1.1 | 227.56 |
| Methyl cinnamic aldehyde (alpha) | 101-39-3 | 2.37 | 240.02 |
| Octalactone delta | 698-76-0 | 1.59 | 249.98 |
| Octalactone gamma | 104-50-7 | 1.59 | 248.37 |
| Orcinyl 3 | 3209-13-0 | 2.14 | 230.36 |
| Oxane 969380 | 59323-76-1 | 2.35 | 209.28 |
| Oxyphenylone | 5471-51-2 | 1.48 | 280.39 |
| Phenoxyethyl alcohol | 122-99-6 | 1.1 | 243.84 |
| Phenylacetaldehyde | 122-78-1 | 1.54 | 201.51 |
| Phenylacetaldehyde glycerine acetal | 29895-73-6 | 0.77 | 312.53 |
| Phenylacetaldehyde dimethyl acetal | 101-48-4 | 1.93 | 219.76 |
| Phenylacetic acid | 103-82-2 | 1.43 | 266.58 |
| Phenylethyl alcohol | 60-12-8 | 1.57 | 224.85 |
| Phenylethyl formate | 104-62-1 | 2.02 | 217.34 |
| Plicatone | 41724-19-0 | 2.45 | 259.49 |
| Propyl fruitate | 6290-17-1 | 1.72 | 231.07 |
| Styrolyl acetate | 93-92-5 | 2.5 | 223.12 |
| Sulfurol (4-methyl-5-thiazole ethanol) | 137-00-8 | 1.11 | 259.88 |
| Sulfurol milky | 137-00-8 | 1.11 | 259.88 |
| Toluylaldehyde (para) | 104-87-0 | 2.26 | 201.5 |
| Trifernal | 16251-77-7 | 2.45 | 228.35 |
| Vanillin | 121-33-5 | 1.05 | 274.3 |
| Veticol acetate | 68083-58-9 | 1.68 | 275.57 |
| Cinnamic aldehyde | 104-55-2 | 1.82 | 226.69 |
| Cinnamic alcohol | 104-54-1 | 1.84 | 248.6 |
| Diantheme | 4125-43-3 | 2.48 | 229.65 |
| Hydratropic alcohol | 1123-85-9 | 1.98 | 232.23 |
| Hydroxycitronellal synth. | 107-75-5 | 2.11 | 241.19 |
| Salicylaldehyde | 90-02-8 | 2.01 | 239.42 |
| Trivalon | 71566-51-3 | 1.39 | 241.44 |
| Anise alcohol | 105-13-5 | 1.16 | 243.83 |

Examples of fragrances of group b) include, but are not limited to:

| Odorant | CAS Number | CLogP | Boiling point [° C.] |
|---|---|---|---|
| aldehyde c 11 | 112-44-7 | 4.25 | 234.81 |
| aldehyde c 11.(en) | 112-45-8 | 4.12 | 233.44 |
| aldehyde c 12 | 112-54-9 | 4.75 | 252.62 |
| aldehyde c 12.mna | 110-41-8 | 4.67 | 241.99 |
| aldehyde supra | 143-14-6 | 4.04 | 240.39 |
| alcohol c 12 | 112-53-8 | 4.77 | 272.96 |
| allyl cyclohexyl propionate | 2705-87-5 | 4.47 | 254.19 |
| azarbre | 68845-36-3 | 4.11 | 259.5 |
| boisiris | 68845-00-1 | 5.44 | 256.67 |
| caryophyllene beta | 87-44-5 | 6.3 | 256.8 |
| cedramber | 19870-74-7 | 5.03 | 265.3 |
| cetonal | 73398-85-3 | 5.2 | 270.68 |
| cis-3-hexenyl-2-methylbutyrate | 53398-85-9 | 4.01 | 224.17 |

-continued

| Odorant | CAS Number | CLogP | Boiling point [° C.] |
|---|---|---|---|
| citronellyl butyrate | 141-16-2 | 5.54 | 272.03 |
| citronellyl formate | 105-85-1 | 4.01 | 220.77 |
| citronellyl isobutyrate | 97-89-2 | 5.47 | 262.03 |
| citronellyl acetate | 150-84-5 | 4.56 | 237.59 |
| citronellyl propionate | 141-14-0 | 5.05 | 255.26 |
| coniferan pure | 67874-72-0 | 4.91 | 250.47 |
| cyclomyral | 68991-96-8 | 4.38 | 271.8 |
| cymol (para) = cymene | 99-87-6 | 4 | 178.34 |
| damarose alpha | 43052-87-5 | 4.29 | 259.84 |
| damascenone bm | 23696-85-7 | 4.21 | 265.13 |
| damascenone | 23696-85-7 | 4.21 | 265.13 |
| damascone alpha | 43052-87-5 | 4.29 | 259.84 |
| damascone beta | 35044-68-9 | 4.42 | 262.93 |
| decyl acetate | 112-17-4 | 4.79 | 247.73 |
| dihydro-beta-ionone | 17283-81-7 | 4.35 | 257.7 |
| dihydro floriffone td | 57378-68-4 | 4.16 | 255.99 |
| dihydro terpinyl acetate = menthanyl acetate | 58985-18-5 | 4.42 | 232.55 |
| diphenyl ether | 101-84-8 | 4.05 | 269.66 |
| dynascone pure | 56973-85-4 | 4.45 | 257.9 |
| ethyl damascenate | 35044-59-8 | 4.25 | 247.88 |
| ethyl-2-4-decadienoate | 3025-30-7 | 4.36 | 258.41 |
| ethyl linalyl acetate | 61931-80-4 | 4.88 | 247.05 |
| ethyl safranate | 35044-59-8 | 4.25 | 247.88 |
| fleuramone | 137-03-1 | 4 | 263.53 |
| floral super | 71077-31-1 | 4.38 | 241.28 |
| floramat | 67801-64-3 | 4.77 | 228.23 |
| folenox | 26619-69-2 | 4.38 | 247.81 |
| frutonile | 69300-15-8 | 4.2 | 250.43 |
| galbanolene super | 16356-11-9 | 5.18 | 196.6 |
| galbascone bht captive | 56973-85-4 | 4.45 | 257.9 |
| geraldehyde | 762-26-5 | 4.43 | 253.84 |
| geranyl isobutyrate | 2345-26-8 | 5.38 | 272.6 |
| geranyl propionate | 105-90-8 | 4.97 | 266.06 |
| givescone | 57934-97-1 | 4.83 | 259.38 |
| gyrane | 24237-00-1 | 4.07 | 214.86 |
| herbanate | 116044-44-1 | 4.13 | 254.37 |
| herbavert | 67583-77-1 | 4.12 | 193.28 |
| hexyl hexanoate | 6378-65-0 | 4.79 | 247.73 |
| irone alpha | 79-69-6 | 4.71 | 271.32 |
| isoamyl hexanoate | 2198-61-0 | 4.23 | 218.34 |
| isobornyl isobutyrate | 85586-67-0 | 4.77 | 251.13 |
| isodamascone | 33673-71-1 | 4.29 | 259.84 |
| isononyl acetate (neononyl acetate) | 58430-94-7 | 4.12 | 198.85 |
| ionone beta synth. | 14901-07-6 | 4.42 | 262.93 |
| ionone pure 100 | 127-41-3 | 4.29 | 259.48 |
| koavone | 86115-11-9 | 4.19 | 207.93 |
| linalyl acetate | 115-95-7 | 4.39 | 228.95 |
| mandarin aldehyde | 20407-84-5 | 4.53 | 257.92 |
| melusate | 67707-75-9 | 4.12 | 198.85 |
| menthyl acetate-rf | 89-48-5 | 4.39 | 234.5 |
| mercapto-8-menthene-1 para | 71159-90-5 | 4.74 | 224.11 |
| methyl ionone gamma coeur #1 | 127-51-5 | 4.84 | 271.6 |
| methyl octyl acetaldehyde (moa) | 19009-56-4 | 4.18 | 223.64 |
| myrcenyl acetate | 1118-39-4 | 4.47 | 221.78 |
| neobutenone alpha | 56973-85-4 | 4.45 | 257.9 |
| neryl acetate | 141-12-8 | 4.48 | 248.97 |
| neryl propionate | 105-91-9 | 4.97 | 266.06 |
| nopyl acetate | 128-51-8 | 4.3 | 259.16 |
| ocimenyl acetate | 72214-23-4 | 4.39 | 228.95 |
| otbca | 88-41-5 | 4.42 | 232.55 |
| ozofleur | 181258-89-9 | 5.1 | 228.54 |
| peranat | 90397-38-9 | 4.65 | 225.84 |
| phellandrene alpha extra | 99-83-2 | 4.62 | 165.01 |
| phenyl ethyl isoamyl ether | 56011-02-0 | 4.16 | 255.27 |
| pinane | 473-55-2 | 4.35 | 149.9 |
| pinene beta | 127-91-3 | 4.35 | 150.8 |
| pinene alpha | 80-56-8 | 4.27 | 157.25 |
| poirenate | 2511-00-4 | 4.04 | 226.74 |
| poivrol | 68966-86-9 | 4.62 | 259.95 |
| ptbca 25 cis | 32210-23-4 | 4.42 | 232.55 |
| ptbca 40 cis | 32210-23-4 | 4.42 | 232.55 |
| sandalore | 65113-99-7 | 5.15 | 273.81 |
| tangerinal 10 dipg semi-captive | 21944-98-9 | 4.53 | 257.92 |
| terpinene gamma | 99-85-4 | 4.75 | 169.36 |

-continued

| Odorant | CAS Number | CLogP | Boiling point [° C.] |
|---|---|---|---|
| terpinene alpha p&f | 99-86-5 | 4.75 | 169.36 |
| terpinolene | 586-62-9 | 4.88 | 178.17 |
| terinyl methyl ether 90 | 14576-08-0 | 4.03 | 196.38 |
| tetrameran | 1322-58-3 | 4.44 | 250.01 |
| thesaron | 22471-55-2 | 4.42 | 235.87 |
| trithioacetone | 828-26-2 | 7.6 | 269.84 |
| troenan | 80480-24-6 | 4.35 | 253.14 |
| undecavertol | 81782-77-6 | 4.05 | 240.58 |
| undecylenic alcohol alcohol c 11 en | 112-43-6 | 4.14 | 254.95 |
| veloutone | 65443-14-3 | 4.34 | 257.68 |
| violette feuilles non dec. | 06.08.8024 | 4.29 | 259.48 |
| violettyne mip 991805 | 166432-52-6 | 4.68 | 204.87 |

Examples of fragrances of group c) include, but are not limited to:

| Odorant | CAS Number | Vapor pressure [Pa] 20° C. |
|---|---|---|
| linalool | 78-70-6 | 6.946 |
| peelessenz | 78-70-6 | 6.946 |
| dihydromyrcenol | 53219-21-9 | 6.986 |
| indocolore semi-captive | 2206-94-2 | 7.586 |
| ethyl phenyl acetate | 101-97-3 | 7.946 |
| citral ar | 5392-40-5 | 7.946 |
| citral n | 5392-40-5 | 7.946 |
| menthyl acetate-rf | 89-48-5 | 7.946 |
| poirenate | 2511-00-4 | 8.066 |
| ethyl acetate | 141-78-6 | 10265 |
| livescone | 3720-16-9 | 10.292 |
| decenal-4-trans | 65405-70-1 | 10.385 |
| myrcenyl acetate | 1118-39-4 | 10.492 |
| orivone | 16587-71-6 | 10.732 |
| methyl heptine carbonate | 111-12-6 | 11.052 |
| citronellyl formate | 105-85-1 | 11.065 |
| ozofleur | 181258-89-9 | 11.479 |
| carvone I | 6485-40-1 | 11.505 |
| linalyl acetate | 115-95-7 | 11.519 |
| benzyl propionate | 122-63-4 | 11.519 |
| montaverdi | 188570-78-7 | 11.585 |
| phenyl acetaldehyde dimethyl acetal | 101-48-4 | 11.665 |
| firascone | 815580-59-7 | 11.692 |
| delphone | 4819-67-4 | 11.705 |
| cyclohexyl ethyl acetate | 21722-83-8 | 11.985 |
| sclareolate | 319002-92-1 | 12.079 |
| centifolether | 120811-92-9 | 12.132 |
| bergamal | 22418-66-2 | 12.998 |
| allyl amyl glycolate | 67634-00-8 | 13.025 |
| phenyl ethyl formate | 104-62-1 | 13.252 |
| mintonat | 67859-96-5 | 13.332 |
| neofolione | 111-79-5 | 13.732 |
| cis-3-hexenyl butyrate | 16491-36-4 | 13.732 |
| methyl phenyl acetate | 101-41-7 | 13.865 |
| 9-decenal | 39770-05-3 | 15.198 |
| isocyclocitral | 1335-66-6 | 15.465 |
| benzyl acetate | 140-11-4 | 16.665 |
| aphermate | 25225-08-5 | 16.665 |
| liffarome | 67633-96-9 | 16.665 |
| cresyl acetate (para) | 140-39-6 | 17.065 |
| linalyl formate | 115-99-1 | 17.731 |
| dihydro anethol | 104-45-0 | 17.998 |
| freskomenthe | 14765-30-1 | 19.065 |
| octyl acetate | 112-14-1 | 19.465 |
| allyl heptanoate-allyl oenanthate | 142-19-8 | 20.265 |
| amyl vinyl carbinol | 3391-86-4 | 20.398 |
| nonadienal | 557-48-2 | 20.798 |
| ethyl caprylate | 106-32-1 | 21.064 |
| aldehyde c 10 | 112-31-2 | 21.064 |
| hexyl butyrate | 2639-63-6 | 21.598 |
| citronellal | 106-23-0 | 22.664 |
| gyrane | 24237-00-1 | 22.931 |

-continued

| Odorant | CAS Number | Vapor pressure [Pa] 20° C. |
|---|---|---|
| claritone | 74338-72-0 | 24.797 |
| methoxymelonal | 62439-41-2 | 24.931 |
| hexenyl-cis-3-isobutyrate | 41519-23-7 | 25.331 |
| toluylaldehyde (para) | 104-87-0 | 25.864 |
| hydratropic aldehyde | 93-53-8 | 27.197 |
| acetophenone | 98-86-2 | 29.464 |
| 2-isopropyl-4-methylthiazole | 15679-13-7 | 29.864 |
| dimetol | 13254-34-7 | 31.597 |
| sultanene captive | 15848-49-4 | 31.597 |
| koavone | 86115-11-9 | 32.264 |
| methyl benzoate | 93-58-3 | 34.263 |
| damascia (frutinate) | 35206-51-0 | 46.796 |
| tetrahydrocitral | 5988-91-0 | 48.129 |
| phenyl ethyl methyl ether | 3558-60-9 | 50.129 |
| cuminaldehyde | 122-03-2 | 50.529 |
| aldehyde c 09 | 124-19-6 | 51.462 |
| dimethyl sulfide | 75-18-3 | 52129 |
| aldehyde c 11 | 112-44-7 | 52.395 |
| amyl valerianate, iso-iso- | 659-70-1 | 53.062 |
| tetrahydrolinalool | 78-69-3 | 53.728 |
| lilessenz | 78-69-3 | 53.728 |
| octalactone gamma | 104-50-7 | 54.662 |
| galbanolene super | 16356-11-9 | 56.128 |
| benzyl acetone | 2550-26-7 | 56.128 |
| aldehyde c 11.(en) | 112-45-8 | 56.395 |
| toscanol | 16510-27-3 | 56.395 |
| otbca | 88-41-5 | 56.662 |
| agrunitrile | 51566-62-2 | 57.195 |
| methyl pamplemousse | 67674-46-8 | 57.861 |
| amarocite | 67674-46-8 | 57.861 |
| geranyl formate | 105-86-2 | 58.795 |
| phenyl ethyl acetate | 103-45-7 | 58.928 |
| methyl octine carbonate | 111-80-8 | 59.061 |
| ptbca 40 cis | 32210-23-4 | 59.195 |
| ptbca 25 cis | 32210-23-4 | 59.195 |
| dihydro terpinyl acetate = menthanyl acetate | 58985-18-5 | 59.195 |
| fenchyl acetate | 13851-11-1 | 59.328 |
| velberry | 13431-57-7 | 59.999 |
| rose oxide r | 16409-43-1 | 60.795 |
| rose oxide I | 3033-23-6 | 60.795 |
| propyl fruitate | 6290-17-1 | 61.061 |
| ethyl heptanoate | 106-30-9 | 63.061 |
| corps eglantine | 64988-06-3 | 64.128 |
| isoamyl-2-methylbutyrate | 27625-35-0 | 64.261 |
| 2.3 diethylpyrazine | 15707-24-1 | 64.528 |
| irolene p | 29127-83-1 | 64.661 |
| dimethyl octenone | 2550-11-0 | 65.327 |
| cyclopidene | 40203-73-4 | 65.327 |
| allyl capronate | 123-68-2 | 66.261 |
| methyl acetophenone para | 122-00-9 | 67.194 |
| hydroquinone dimethyl ether | 150-78-7 | 67.194 |
| 2-cyclopentyl cyclopentanone | 4884-24-6 | 68.394 |
| dibutyl sulphide | 544-40-1 | 69.727 |
| ocimenyl acetate | 72214-23-4 | 71.727 |
| trifernal | 16251-77-7 | 73.993 |
| 4-methylthio-4-methyl-2-pentanone | 23550-40-5 | 81.326 |
| citrathal | 147060-73-9 | 82.659 |
| citral dimethyl acetal | 7549-37-3 | 82.659 |
| alcohol c 08 | 111-87-5 | 83.059 |
| hexenol (beta gamma) | 928-96-1 | 83.459 |
| octanol-3 | 589-98-0 | 83.593 |
| isobornyl acetate | 125-12-2 | 85.059 |
| ethyl acetoacetate | 141-97-9 | 85.992 |
| givescone | 57934-97-1 | 87.326 |
| guaiacol | 90-05-1 | 88.526 |
| isopentyrate | 80118-06-5 | 91.992 |
| terpinolene | 586-62-9 | 93.592 |
| benzaldehyde pure | 100-52-7 | 93.992 |
| methyl octyl acetaldehyde | 19009-56-4 | 95.058 |
| vivaldie | 292605-05-1 | 95.458 |
| tetrahydromyrcenol | 18479-57-7 | 95.725 |
| styrolyl acetate | 93-92-5 | 97.725 |
| methyl nonyl ketone | 112-12-9 | 98.791 |

-continued

| Odorant | CAS Number | Vapor pressure [Pa] 20° C. |
|---|---|---|
| hexenyl acetate | 3681-71-8 | 106.12 |
| terpinene gamma | 99-85-4 | 108.12 |
| cresyl methyl ether (para) | 104-93-8 | 111.85 |
| orrisate | 816-19-3 | 133.32 |
| hexyl acetate | 142-92-7 | 135.98 |
| aldehyde c 12 mna | 110-41-8 | 139.98 |
| aldehyde c 08 | 124-13-0 | 139.98 |
| myroxide | 69103-20-4 | 143.98 |
| ethyl butyrate | 105-54-4 | 1453.2 |
| 2.6-dimethyl pyrazine | 108-50-9 | 147.98 |
| amyl propionate | 624-54-4 | 157.32 |
| butyl butyrate | 109-21-7 | 165.31 |
| methyl heptenone | 110-93-0 | 169.31 |
| ethyl capronate | 123-66-0 | 169.31 |
| methyl hexyl ketone | 111-13-7 | 177.31 |
| acetoin | 513-86-0 | 181.31 |
| phellandrene alpha extra | 99-83-2 | 181.31 |
| isobutyl acetate | 110-19-0 | 1826.5 |
| limetol | 7392-19-0 | 191.98 |
| cerezoate | 1617-23-8 | 198.65 |
| neoproxen | 31996-78-8 | 198.65 |
| cyclamen aldehyde extra I.g. | 103-95-7 | 2053.1 |
| pinane | 473-55-2 | 209.31 |
| isoamyl propionate | 105-68-0 | 235.98 |
| pinene beta p&f | 127-91-3 | 239.98 |
| ethyl isobutyrate | 97-62-1 | 2439.7 |
| hexenyl-3-formate | 33467-73-1 | 273.31 |
| methylbutyl-2 propionate | 2438-20-2 | 274.64 |
| manzanate | 39255-32-8 | 274.64 |
| phenyl acetaldehyde | 122-78-1 | 28.93 |
| ethyl tiglate | 5837-78-5 | 289.3 |
| triplal | 27939-60-2 | 31.73 |
| diethyl malonate | 105-53-3 | 32.53 |
| menthone | 14073-97-3 | 33.73 |
| isomenthone | 491-07-6 | 33.73 |
| ethyl amyl ketone | 541-85-5 | 331.97 |
| aldehyde c 07 | 111-71-7 | 337.3 |
| isononyl acetate (neononyl acetate) | 58430-94-7 | 34.53 |
| rumacetal | 1670-47-9 | 36.13 |
| 2-isobutyl thiazole | 18640-74-9 | 36.13 |
| pinene alpha | 80-56-8 | 390.63 |
| prenyl acetate | 1191-16-8 | 401.3 |
| isobutyl isobutyrate | 97-85-8 | 411.96 |

-continued

| Odorant | CAS Number | Vapor pressure [Pa] 20° C. |
|---|---|---|
| hexenal-2-trans | 6728-26-3 | 455.96 |
| ethyl valerate | 539-82-2 | 463.96 |
| isopropyl methyl-2-butyrate | 66576-71-4 | 517.29 |
| isovaleraldehyde | 590-86-3 | 5306.2 |
| melonal | 106-72-9 | 69.86 |
| hexanol | 111-27-3 | 78.26 |
| ethyl-2-methylbutyrate | 7452-79-1 | 786.6 |
| aldehyde c 06 | 66-25-1 | 941.25 |

Preferably, mixtures of odorants are used, for example at least two or more different odorants of groups b) and/or at least two or more different odorants of group c).

In various embodiments, the proportion of the odorants of group a) may also be less than 6, less than 5, less than 4, less than 3, less than 2, or less than 1 wt. %. In various embodiments, the perfume composition may contain no odorants of group a). In alternative embodiments, the perfume composition contains odorants of group a), but in amounts below the upper limits indicated here.

In various embodiments, the fragrances of groups b) and c) may together make up at least 60, preferably at least 65, at least 70, at least 75, at least 80, at least 85, or at least 90 wt. % of the total odorants of the perfume composition.

The quantitative data given herein refer to the sum of all odorants in the encapsulated perfume composition, unless otherwise indicated. Alternatively, they may also refer to the total weight of the encapsulated perfume composition, for example when same contains formulation auxiliaries.

In addition to the above-mentioned fragrances of groups a) to c), further fragrances may be used as constituents of the encapsulated perfume composition, as long as features a) to c) are met. These additional fragrances are not subject to any particular restrictions.

The tightness of the microcapsules for the fragrant oil Weioclean from Kitzing was determined herein. Weioclean has the following components (with proportion based on the total weight):

| | |
|---|---|
| 1-(1,2,3,4,5,6,7,8-Octahydro-2,3,8,8-tetramethyl-2-naphthalenyl)ethanone | 25-50% |
| Benzoic acid, 2-hydroxy, 2-hexyl ester | 10-25% |
| Phenyl methyl benzoate | 5-10% |
| 3-Methyl-4-(2,6,6-trimethyl-2-cyclohexenyl)-3-buten-2-one | 1-5% |
| 3,7-Dimethyl-6-octen-1-ol | 1-5% |
| 3-Methyl-5-phenylpentanol | 1-5% |
| 2,6-Dimethyloct-7-en-2-ol | 1-5% |
| 4-(2,6,6-Trimethylcyclohex-1-enyl)-but-3-en-2-one | 1-5% |
| 3a,4,5,6,7,7a-Hexahydro-4,7-methano-1H-indene-6-yl-propanoate | 1-5% |
| 2-tert-Butylcyclohexyl acetate | 1-5% |
| 2-Heptyl cyclopentanone | 1-5% |
| Pentadecan-15-olide | 1-5% |
| 2H-1-Benzopyran-2-one | 0.1-1% |
| 2,6-Di-tert-butyl-p-cresol | 0.1-1% |
| 4-Methyl-3-decen-5-ol | 0.1-1% |
| 2,4-Dimethyl-3-cyclohexene-1-carboxaldehyde | 0.1-1% |
| [(2E)-3,7-Dimethylocta-2,6-dienyl] acetate | 0.1-1% |
| Allyl hexanoate | 0.1-1% |
| 2-Methylundecanal | 0.1-1% |
| 10-Undecenal | 0.1-1% |
| cis-3,7-Dimethyl-2,6-octadienyl ethanoate | 0.1-1% |
| 3,7,11-Trimethyldodeca-1,6,10-trien-3-ol | 0.1-1% |
| Undecan-2-one | 0.1-1% |

According to a preferred embodiment, the core material does not contain monosaccharide polyol, in particular does not contain mannitol, erythritol, xylitol, sorbitol, or mixtures thereof.

Microcapsule Slurry

The microcapsules described herein are typically preformulated in the form of a dispersion, which is also referred to as a slurry. To this end, the capsules are dispersed into an aqueous medium in order to produce a suspension of the capsules in the liquid medium.

According to an embodiment, the term "dispersion" or "microcapsule dispersion" also includes suspensions and slurries as described herein.

In the context of the present disclosure, the term "slurry" refers to a typically aqueous suspension of the perfume microcapsules, as defined above. The liquid medium (continuous phase) consists of water preferably majoritarily, i.e. by more than 50 wt. % water, for example more than 60, more than 70, or more than 80 wt. %, but may also consist of water virtually or completely, i.e. by 90 wt. %, 95 wt. %, or more. The slurry is preferably pourable, i.e. it can be poured out of a vessel by tilting the vessel. A pourable slurry should, in particular, be understood to mean a capsule-liquid mixture which, in particular at the processing temperature, preferably at most 40° C., in particular at most 20° C., has a viscosity below $10^4$ mPas, preferably below $10^3$ mPas (Brookfield rotational viscometer; spindle 2, 20 rpm).

In addition to the emulsifier used, the slurry may contain further auxiliaries, for example those which ensure a certain durability or stability. Frequently used excipients include surfactants, in particular anionic and/or non-ionic surfactants, which are different from the emulsifier used.

As already described above, emulsifiers/surfactants from the class of ethoxylated, hydrogenated castor oils are used as additives in the slurries of the microcapsules described herein (INCI: ethoxylated hydrogenated castor oil), in particular those having 20 to 60, 30 to 50 or, for example, 40 EO. The latter are also known as PEG40 hydrogenated castor oil and are commercially available, for example as Eumulgin® HRE 40 from BASF. These emulsifiers are used in the slurries in amounts of up to 50 wt. %, preferably up to 40 wt. %, up to 30 wt. %, or up to 20 wt. %, particularly preferably at most 10 wt. %, typical amounts being in the range of at least 0.5 wt. %, at least 1 wt. %, or at least 2 wt. %, in particular in ranges of from 2 to 10 wt. %, 3 to 9 wt. %, or 4 to 8 wt. %, or approximately 4, 5, 6, or 7 wt. %. If the emulsifier is a constituent of the continuous phase, it preferably contains more than 50 wt. % water and the sum of water and emulsifier preferably makes up at least 70 wt. %, more preferably at least 80 wt. %, even more preferably at least 90 wt. % of the continuous phase. In various embodiments, the continuous phase consists of water and the at least one emulsifier.

In various embodiments, the continuous phase contains 60 to 95 wt. %, preferably 70 to 95 wt. %, of water, and 2 to 40 wt. %, preferably 2 to 20 wt. %, of the at least one emulsifier.

Surprisingly, it has been found that these emulsifiers are able to stabilize the slurries, whereas other typical emulsifiers, for example hydroxypropyl guar (CAS 39421-75-5, for example Jaguar HP105), ethoxylated $C_{12-18}$ fatty alcohols (such as Dehydol® LT5), and ethoxylated sorbitan monoesters, for example polyoxyethylene sorbitan monopalmitate (CAS 9005-66-7), could not bring about sufficient stabilization.

Although it is possible to use further emulsifiers as the emulsifiers, this is not preferred. In particular, it is preferred if the microdispersion does not contain potassium cetyl phosphate. In addition to the emulsifiers, however, it is possible to use other auxiliaries and additives which are not emulsifiers or surfactants. According to a preferred embodiment, the composition does not contain a hydroxylated diphenylmethane derivative.

In various embodiments, the capsules described above are contained in an amount of from 1 to 60 wt. %, based on the total weight of the microcapsule dispersion. The microcapsules may be contained, for example, in an amount of 2 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, 36 wt. %, 38 wt. %, 40 wt. %, 42 wt. %, 44 wt. %, 46 wt. %, 48 wt. %, 50 wt. %, 52 wt. %, 54 wt. %, 56 wt. %, 58 wt. %, or 60 wt. %. According to one embodiment, the proportion of the microcapsules is in the range of from 15 to 50 wt. %. According to a preferred embodiment, the proportion of the microcapsules in the slurry is in the range of from 20 to 35 wt. %. These dispersions are stable, i.e. even after longer storage periods of, for example, several days to weeks at typical temperatures in the range of up to 40° C., for example 4 weeks at a temperature of between >0 and 40° C., no agglomeration, sedimentation, and/or floating of the capsules or other phase separation occurs, this pronounced phase stability being due to the use of the special emulsifier.

During the preparation of these slurries, the microcapsules are typically dispersed by means of suitable agents into an aqueous continuous phase which already contains the emulsifier used.

The phase-stabilizing effect occurs within a wide pH range. In particular, the phase-stabilizing effect of the emulsifier comes into play when the pH is not strongly basic. According to one embodiment, the pH of the microcapsule dispersion after the emulsifier is added is less than 11, for example the pH of the microcapsule dispersion may be 10.8, 10.5, 10.3, 10.0, 9.8, 9.5, 9.3, 9.0, 8.8, 8.5, 8.3, 8.0, 7.8, 7.5, 7.3, 7.0, 6.8, 6.5, 6.3, or 6.0. The microcapsule dispersion is generally basic. The pH of the microcapsule dispersion may be less than 10.8, preferably at most 10.5. In one embodiment, the pH of the microcapsule dispersion is at least 6, preferably at least 7, and particularly preferably at least 8.

The phase-stabilizing effect occurs within a wide conductivity range. The conductivity of the microcapsule dispersion may be at least 6.0 mS/cm. For example, the conductivity may be 6.0 mS/cm, 6.5 mS/cm, 7.0 mS/cm, 7.5 mS/cm, 8.0 mS/cm, 8.5 mS/cm, 9.0 mS/cm, 10 mS/cm, 10.5 mS/cm, 11 mS/cm, 11.5 mS/cm, 12 mS/cm, 12.5 mS/cm, 13.0 mS/cm, 13.5 mS/cm, 14 mS/cm, 14.5 mS/cm, or 15.0 mS/cm. According to one embodiment, the conductivity of the microcapsule dispersion is in the range of from 6.0 mS/cm to 15.0 mS/cm, preferably in the range of from 8 mS/cm to 12 mS/cm, more preferably in the range of from 9 mS/cm to 11 mS/cm.

The combination unit pH/Cond 3320 from WTW can be used for the measurements of the pH and electrical conductivity of the agent or of the microcapsule dispersion. Said combination unit is equipped with a pH electrode of the model "Inlab Expert" (Order Number: 5343103) from Mettler Toledo and also a conductivity electrode of the model "Tetra Con 325" from WTW. When it is not being used, the glass membrane of the pH electrode is stored in 3M KCl solution. Regular calibration of the two electrodes ensures a measurement uncertainty of approx. +/−0.01 and +/−0.05 mS/cm. Both pH and conductivity electrodes are provided with a temperature sensor, and therefore temperature compensation of the measured values is possible.

To record the pH, the pH electrode can be removed from the corresponding 3M KCl storage solution and cleaned by means of tap water. Subsequently, the electrode is immersed in the corresponding microcapsule dispersion, it being ensured that the entire glass membrane of the electrode was immersed. After the measured value has stabilized, the measured value is read after approx. 5 min. The displayed measured value is dimensionless. The measurements are carried out in undiluted microcapsule dispersions. To measure the electrical conductivity, the cleaned conductivity electrode is immersed in the corresponding microcapsule dispersion. In the process, it is ensured that the actual measuring gap of the electrode has been completely immersed. After the measured value has stabilized, the temperature-compensated measured value is read after approx. 5 min. The displayed measured value has the unit mS/cm.

Dried Microcapsule Composition

In another embodiment, the microcapsule dispersion containing the emulsifier may also be present as a dried composition, i.e. as a powder mixture. The dried microcapsule composition can be obtained, in particular, by drying a (liquid) microcapsule dispersion described above. Various methods are known to a person skilled in the art for drying the liquid microcapsule dispersion, for example spray drying, fluidized bed drying, spray granulation, spray agglomeration, or evaporation.

After drying, the water content in the dried microcapsule dispersion is less than 5 wt. %. The water content may be 5 wt. %, 1 wt. %, 0.8 wt. %, 0.5 wt. %, 0.1 wt. %, 0.05 wt. %, 0.01 wt. %, 0.001 wt. %, or 0.0001 wt. %. According to one embodiment of the dried microcapsule dispersion, the water content is less than 1 wt. %, preferably less than 0.01 wt. %, more preferably less than 0.001 wt. %. Particularly preferably, the dried microcapsule dispersion contains no water, except for unavoidable traces thereof.

In this case, drying and spraying aids, such as finely divided silicon dioxide (Aerosil® from Evonik Industries), may be added to the liquid mixture.

The dried microcapsule dispersion (powder mixture) comprising the emulsifier can then be incorporated into agents, intermediate products, or formulations, for example by means of redispersion in a liquid medium, preferably in an aqueous phase. In this way, the dry content of the formulation can be adjusted directly by means of the mixing ratio of powder mixture and liquid medium.

In various embodiments, an agent may contain the described microcapsule dispersion.

The phase-stabilizing effect of the emulsifier on the microcapsules is particularly advantageous here, specifically when the microcapsule dispersion is brought into contact or mixed with another solution or dispersion during preparation of an agent in order to form an intermediate product or the final agent. The agent may be solid or liquid. According to one embodiment, the agent is liquid.

The phase-stabilizing effect occurs within a wide pH range. In particular, the phase-stabilizing effect of the emulsifier comes into play when the pH is not strongly basic. According to one embodiment, the pH of the agent is less than 10. For example, the pH of the agent may be 9.5, 9.0, 8.5, 8.0, 7.5, 7.0, 6.5, 6.0, 5.5, 5.0, 4.5, 4.0, 3.5, 3.0, 2.5, 2.0, or 1.5. The pH may be less than 9, less than 8, or less than 7. The phase-stabilizing effect of the emulsifier is significant, in particular in an acidic environment. Consequently, in one embodiment, the pH of the agent is less than 6, preferably less than 5, more preferably less than 4, and particularly preferably less than 3.

The phase-stabilizing effect occurs within a wide conductivity range. According to one embodiment, the conductivity of the agent is up to 100 mS/cm, preferably up to 60 mS/cm, up to 50 mS/cm, or up to 40 mS/cm, particularly preferably 34 mS/cm, typical conductivities being in the range of at least 0.1 mS/cm, at least 0.2 mS/cm, at least 0.3 mS/cm, at least 2.0 mS/cm, or at least 8.0 mS/cm. For example, the conductivity may be 0.4 mS/cm, 0.5 mS/cm, 0.6 mS/cm, 0.7 mS/cm, 0.8 mS/cm, 0.9 mS/cm, 1.0 mS/cm, 1.5 mS/cm, 2.0 mS/cm, 3.0 mS/cm, 4.0 mS/cm, 5.0 mS/cm, 6.0 mS/cm, 7.0 mS/cm, 8.0 mS/cm, 9.0 mS/cm, 10.0 mS/cm, 12.0 mS/cm, 14.0 mS/cm, 16.0 mS/cm, 18.0 mS/cm, 20.0 mS/cm, 22.0 mS/cm, 24.0 mS/cm, 26.0 mS/cm, 28.0 mS/cm, 30.0 mS/cm, 32.0 mS/cm, or 34.0 mS/cm. According to one embodiment of the agent, the conductivity is in the range of from 0.2 mS/cm to 6.0 mS/cm, preferably in the range of from 0.3 mS/cm to 5.0 mS/cm, more preferably in the range of from 0.4 mS/cm to 4.0 mS/cm. In this case, the pH is preferably in the acidic range, in particular below pH 4.0. According to another embodiment, the conductivity is in the range of from 7.0 mS/cm to 40.0 mS/cm, preferably in the range of from 8.0 mS/cm to 34.0 mS/cm. In this case, the pH is preferably in the neutral or basic range, in particular in the range of from 7.5 to 9.0.

The microcapsule dispersion can be used to form the agent or the intermediate product thereof. According to one embodiment, the agent or the intermediate formed by addition of the microcapsule dispersion has a pH and/or conductivity as defined for the agent. According to one embodiment, the agent or intermediate product formed by addition of the microcapsule dispersion has a pH of less than 10, preferably less than 9, more preferably less than 5, and particularly preferably less than 4, and/or a conductivity of more than 0.3 mS/cm, preferably more than 1.0 mS/cm, more preferably more than 2.5 mS/cm, and particularly preferably more than 5.0 mS/cm.

Detergent or Cleaning Agent Containing Microcapsules

Due to the robustness or tightness of these biodegradable capsules, they can advantageously be used in a detergent and cleaning agent or in cosmetic agents, these agents including fabric softeners, textile care agents, solid detergents, for example granules or powders, liquid detergents, household cleaners, bath and toilet cleaners, hand dishwashing agents, machine dishwashing agents, hand soaps, shampoos, shower gels, creams, and the like, but are not limited thereto. The agents described herein may be in solid or liquid form, however liquid formulations may be preferred.

Irrespective of the nature of the agents, they comprise the microcapsules described herein and the emulsifier described herein, said two components being preformulated, i.e. they have already been brought into contact with one another before being added to the agent, typically by preformulation of the capsules in a slurry containing the emulsifier. The amount of co-formulated emulsifier also varies depending on the amount of microcapsules used in the end product. However, typical amounts are in the range of from 0.001 to 0.25 wt. % relative to the total weight of the agent. In order of increasing preference, ranges of up to 0.20, up to 0.15, up to 0.12, up to 0.10, or up to 0.08 wt. % are used. The lower limit is typically in the range of from 0.001 or 0.005 or 0.01 wt. %. It has been found that the stabilizing effect of the emulsifiers used extends not only to the preformulated slurry, but also to the (liquid) end product, and therefore the phase-stabilizing effect on the microcapsules can also be observed in the end product. However, this effect is dependent on the preformulation of the microcapsules with the emulsifier and does not occur when the microcapsules and emulsifier are formulated separately into the agent.

The detergents or cleaning agents preferably comprise at least one ingredient selected from the group of surfactants, enzymes, builders, and attachment-enhancing agents.

The detergents and cleaning agents may contain anionic, non-ionic, cationic, amphoteric, or zwitterionic surfactants or mixtures thereof. These surfactants are typically different surfactants from the emulsifiers used during formulation of the microcapsules. In various embodiments, the surfactants comprise, in particular, at least one anionic surfactant and/or at least one non-ionic surfactant, in particular if the agent is a detergent or cleaning agent in the narrower sense, i.e., for example, laundry detergents, dishwashing detergents, and household and bath cleaners.

Suitable non-ionic surfactants are, in particular, ethoxylation and/or propoxylation products of alkyl glycosides and/or linear or branched alcohols each having 12 to 18 C atoms in the alkyl moiety and 3 to 20, preferably 4 to 10 alkyl ether groups. Furthermore, corresponding ethoxylation and/or propoxylation products of N-alkylamines, vicinal diols, fatty acid esters, and fatty acid amides, which correspond to the above-mentioned long-chain alcohol derivatives with respect to the alkyl moiety, and of alkylphenols having 5 to 12 C atoms in the alkyl radical, may be used.

Suitable anionic surfactants are, in particular, soaps and those which contain sulfate or sulfonate groups, preferably having alkali ions as cations. Usable soaps are, preferably, alkali salts of saturated or unsaturated fatty acids having 12 to 18 C atoms. Fatty acids of this kind can also be used in a not completely neutralized form. Usable surfactants of the sulfate type include salts of sulfuric acid half-esters of fatty alcohols having 12 to 18 C atoms and sulfation products of the above-mentioned non-ionic surfactants having a low degree of ethoxylation. Usable surfactants of the sulfonate type include linear alkylbenzene sulfonates having 9 to 14 C atoms in the alkyl moiety, alkane sulfonates having 12 to 18 C atoms, and olefin sulfonates having 12 to 18 C atoms, which are formed in the reaction of corresponding monoolefins with sulfur trioxide, as well as alpha-sulfofatty acid esters, which are formed during the sulfonation of fatty acid methyl or ethyl esters.

Cationic surfactants are preferably selected from among esterquats and/or quaternary ammonium compounds (QAC) according to the general formula $(R^{I})(R^{II})(R^{III})(R^{IV})N^{+} X^{-}$, in which $R^{I}$ to $R^{IV}$ stand for equal or different $C_{1-22}$ alkyl radicals, $C_{7-28}$ aryl alkyl radicals, or heterocyclic radicals, with two or, in the case of aromatic integration as in pyridine, even three radicals, together with the nitrogen atom, forming the heterocycle, e.g. a pyridinium or imidazolinium compound, and X-standing for halide ions, sulfate ions, hydroxide ions, or similar anions. QACs can be prepared by reacting tertiary amines with alkylating agents, such as methyl chloride, benzyl chloride, dimethyl sulfate, dodecyl bromide, but also ethylene oxide. The alkylation of tertiary amines with one long alkyl radical and two methyl groups is particularly easy, and quaternization of tertiary amines with two long radicals and one methyl group can be carried out with the aid of methyl chloride under mild conditions. Amines having three long alkyl radicals or hydroxy-substituted alkyl radicals are less reactive and are quaternized with dimethyl sulfate, for example. Suitable QACs are, for example, benzalkonium chloride (N-alkyl-N, N-dimethyl benzyl ammonium chloride), benzalkone B (m,p-dichlorobenzyl dimethyl-$C_{12}$-alkylammonium chloride, benzoxonium chloride (benzyl dodecyl-bis-(2-hydroxyethyl)-ammonium chloride), cetrimonium bromide (N-hexadecyl-N,N-trimethyl ammonium bromide), benzethonium chloride (N,N dimethyl-N [2-[2-[p-(1,1,3,3-tetramethylbutyl) phenoxy]ethoxy]ethyl]benzyl ammonium chloride), dialkyl dimethyl ammonium chlorides such as Di-n-decyl dimethyl ammonium chloride, didecyl dimethyl ammonium bromide, dioctyl dimethyl ammonium chloride, 1-cetyl pyridinium chloride, and thiazoline iodide, and mixtures thereof. Preferred QACs are benzalkonium chlorides having $C_8$-$C_{22}$ alkyl radicals, in particular $C_{12}$-$C_{14}$ alkyl benzyl dimethyl ammonium chloride.

Preferred esterquats are methyl-N-(2-hydroxyethyl)-N, N-di (talgacyloxyethyl) ammonium methosulfate, bis(palmitoyl) ethyl hydroxyethyl methyl ammonium methosulfate, or methyl-N,N-bis (acyloxyethyl)-N-(2-hydroxyethyl) ammonium methosulfate. Commercial examples are the methyl hydroxyalkyl dialkoyl oxyalkyl ammonium methosulfates from Stepan marketed under the trademark Stepantex® or the products from BASF SE known under the trade name Dehyquart® or the products from Evonik known under the name Rewoquat®. Cationic surfactants such as those described above are used primarily in fabric softeners.

The amounts of the individual ingredients in the detergents and cleaning agents are each based on the intended purpose of the composition in question and a person skilled in the art is generally familiar with the orders of magnitude of the amounts of the ingredients to be used or can derive this from the relevant technical literature. Depending on the intended use of the compositions, the surfactant content, for example, is selected to be higher or lower. Typically, for example, the surfactant content of detergents may be from 10 to 50 wt. %, preferably from 12.5 to 30 wt. %, and more preferably from 15 to 25 wt. %.

The detergents and cleaning agents may contain, for example, at least one water-soluble and/or water-insoluble, organic and/or inorganic builder. The water-soluble organic builder substances include polycarboxylic acids, in particular citric acid and saccharic acids, monomer and polymer aminopolycarboxylic acids, in particular methylglycinediacetic acid, nitrilotriacetic acid, ethylenediaminetetraacetic acid, and polyaspartic acid, polyphosphonic acids, in particular aminotris(methylene phosphonic acid), ethylenediaminetetrakis(methylenephosphonic acid), and 1-hydroxyethane-1,1-diphosphonic acid, polymer hydroxy compounds such as dextrin, and also polymer (poly)carboxylic acids, polymer acrylic acids, methacrylic acids, maleic acids, and mixed polymers from these, which may also contain small proportions of polymerizable substances without carboxylic acid functionality in polymerized form. Suitable, albeit less preferred compounds of this class are copolymers of acrylic acid or methacrylic acid with vinyl ethers, such as vinyl methyl ethers, vinyl esters, ethylene, propylene, and styrene, in which the proportion of the acid is at least 50 wt. %. The organic builder substances can be used, in particular, for preparing liquid detergents and cleaning agents, in the form of aqueous solutions, preferably in the form of 30 to 50 wt. % aqueous solutions. All of said acids are generally used in the form of their water-soluble salts, in particular their alkali salts.

Organic builder substances may, if desired, be contained in amounts of up to 40 wt. %, in particular up to 25 wt. %, and preferably from 1 wt. % to 8 wt. %. Amounts close to the stated upper limit are preferably used in pasty or liquid, in particular water-containing, agents. Laundry post-treatment agents, such as fabric softeners, may optionally also be free of organic builders.

In particular, alkali silicates and polyphosphates, preferably sodium triphosphate, are suitable as water-soluble inorganic builder materials. In particular, crystalline or amorphous alkali aluminosilicates may be used as water-insoluble, water-dispersible inorganic builder materials, if desired, in amounts of up to 50 wt. %, preferably not more than 40 wt. %, and in liquid compositions from 1 wt. % to 5 wt. %, in particular. Among these, crystalline sodium aluminosilicates of detergent quality, in particular zeolite A, P, and optionally X, are preferred. Amounts close to the stated upper limit are preferably used in solid, particulate agents. Suitable aluminosilicates have, in particular, no particles having a particle size above 30 μm and preferably consist by at least 80 wt. % of particles having a size below 10 μm.

Suitable substitutes or partial substitutes for the above-mentioned aluminosilicate are crystalline alkali silicates, which can be present alone or in a mixture with amorphous silicates. The alkali silicates that can be used as builders in detergents or cleaning agents preferably have a molar ratio of alkali oxide to $SiO_2$ of under 0.95, in particular 1:1.1 to 1:12, and can be present in amorphous or crystalline form. Preferred alkali silicates are sodium silicates, in particular amorphous sodium silicates, having a molar ratio of $Na_2O$:$SiO_2$ of from 1:2 to 1:2.8. Crystalline sheet silicates of the general formula $Na_2Si_xO_{2x+1}\cdot yH_2O$, in which x, the so-called modulus, is a number from 1.9 to 4 and y is a number from 0 to 20 and preferred values for x are 2, 3, or 4, are preferably used as crystalline silicates, which can be present alone or in a mixture with amorphous silicates. Preferred crystalline sheet silicates are those in which x assumes the values 2 or 3 in the above-mentioned general formula. In particular, both beta- and delta-sodium disilicates ($Na_2Si_2O_5\cdot yH_2O$) are preferred. Virtually anhydrous crystalline alkali silicates that are produced from amorphous alkali silicates and that are of the above-mentioned general formula, in which x is a number from 1.9 to 2.1, may also be used. In another preferred embodiment, a crystalline sodium sheet silicate having a modulus of 2 to 3 of the like that can be produced from sand and soda is used. Crystalline sodium silicates having a modulus in the range of from 1.9 to 3.5 are used in another preferred embodiment of the textile treatment or cleaning agents. If alkali aluminosilicate, in particular zeolite, is also present as an additional builder substance, the weight ratio of aluminosilicate to silicate, based in each case on anhydrous active substances, is preferably 1:10 to 10:1. In compositions containing both amorphous and crystalline alkali silicates, the weight ratio of amorphous alkali silicate to crystalline alkali silicate is preferably 1:2 to 2:1 and in particular 1:1 to 2:1.

Builders are preferably contained in amounts of up to 60 wt. %, in particular 5 wt. % to 40 wt. %, if desired. Laundry post-treatment agents, such as fabric softeners, are preferably free of inorganic builder.

In various embodiments, an agent further comprises at least one enzyme.

The enzyme may be a hydrolytic enzyme or other enzyme in a concentration that is appropriate for the effectiveness of the agent. One embodiment thus constitutes agents comprising one or more enzymes. All enzymes which can exhibit catalytic activity in the agent can preferably be used as enzymes, in particular a protease, amylase, cellulase, hemicellulase, mannanase, tannase, xylanase, xanthanase, xyloglucanase, β-glucosidase, pectinase, carrageenase, perhydrolase, oxidase, oxidoreductase, or a lipase, and mixtures thereof. Enzymes are advantageously each contained in the agent in an amount of from $1\times10^{-8}$ to 5 wt. %, relative to active protein. In order of increasing preference, each enzyme is contained in agents in an amount of from $1\times10^{-7}$ to 3 wt. %, 0.00001 to 1 wt. %, 0.00005 to 0.5 wt. %, 0.0001 to 0.1 wt. %, and particularly preferably 0.0001 to 0.05 wt. %, relative to active protein. Particularly preferably, the enzymes exhibit synergistic cleaning performance with respect to particular dirt or stains, i.e. the enzymes contained in the agent composition assist one another in their cleaning performance. Synergistic effects can occur not only between different enzymes but also between one or more enzymes and other ingredients of the agent.

The amylase(s) is/are preferably an α-amylase. The hemicellulase is preferably a pectinase, a pullulanase, and/or a mannanase. The cellulase is preferably a cellulase mixture or a single-component cellulase, preferably or predominantly an endoglucanase and/or a cellobiohydrolase. The oxidoreductase is preferably an oxidase, in particular a choline oxidase, or a perhydrolase.

The proteases used are preferably alkaline serine proteases. They act as unspecific endopeptidases, i.e. they hydrolyze any acid amide bonds that lie inside peptides or proteins and thereby cause the degradation of protein-containing dirt on the washware. Their optimum pH is usually in the distinctly alkaline range. In preferred embodiments, the enzyme contained in the agent is a protease.

The enzymes used herein may be naturally occurring enzymes or enzymes that have been altered by one or more mutations based on naturally occurring enzymes in order to positively influence desired properties such as catalytic activity, stability, or disinfecting performance.

In preferred embodiments, the enzyme is contained in the agent in the form of an enzyme product in an amount of from 0.01 to 10 wt. %, preferably 0.01 to 5 wt. %, relative to the total weight of the agent. The active protein content is preferably in the range of from 0.00001 to 1 wt. %, in particular 0.0001 to 0.2 wt. %, relative to the total weight of the agent.

The protein concentration can be determined using known methods, for example the BCA method (bicinchoninic acid; 2,2'-bichinolyl-4,4'-dicarboxylic acid) or the Biuret method. In this regard, the active protein concentration is determined by means of titration of the active centers using a suitable irreversible inhibitor (for proteases, for example, phenylmethylsulfonyl fluoride (PMSF)) and determination of the residual activity (cf. M. Bender et al., J. Am. Chem. Soc. 88, 24 (1966), p. 5890-5913).

In the agents described herein, the enzymes to be used may also be formulated together with accompanying substances, for example from fermentation. In liquid formulations, the enzymes are preferably used as liquid enzyme formulation(s).

The enzymes are generally not provided in the form of the pure protein, but rather in the form of stabilized, storable, and transportable preparations. These ready-made preparations include, for example, the solid preparations obtained by means of granulation, extrusion, or lyophilization or, in particular in the case of liquid or gel agents, solutions of the enzymes, advantageously as concentrated as possible, containing little water, and/or admixed with stabilizers or other auxiliaries.

Alternatively, the enzymes may be encapsulated both for the solid and also for the liquid dosage form, for example by means of spray-drying or extrusion of the enzyme solution together with a preferably natural polymer or in the form of capsules, for example those in which the enzymes are enclosed as in a solidified gel or in those of the core-shell type, in which an enzyme-containing core is coated with a protective layer which is impermeable to water, air, and/or chemicals. Further active substances, for example stabilizers, emulsifiers, pigments, bleaches, or dyes, may additionally be applied in deposited layers. Such capsules are applied by methods known per se, for example by shaking or rolling granulation or in fluidized bed processes. Advantageously, granules of this kind are dust-resistant, for example by means of the application of polymer film formers, and are stable during storage due to the coating.

Furthermore, it is possible to formulate two or more enzymes together, such that a single granule has multiple enzyme activity.

In various embodiments, the agent may have one or more enzyme stabilizers.

Attachment-enhancing agents are means which improve the attachment of the microcapsules to surfaces, in particular textile surfaces. This category of agents includes, for example, the esterquats mentioned above. Further examples are so-called SRPs (soil repellent polymers), which may be non-ionic or cationic, of note being, in particular, polyethylenimines (PEI) and ethoxylated variants thereof and polyesters, in particular esters of terephthalic acid, especially those of ethylene glycol and terephthalic acid or polyester/polyethers of polyethylene terephthalate and polyethylene glycol. Finally, anionic or non-ionic silicones also fall under this group. Exemplary compounds are also disclosed in patent specification EP 2 638 139 A1.

Furthermore, the detergents and cleaning agents may contain further ingredients which further improve the practical and/or aesthetic properties of the composition depending on the intended use. Such agents may contain bleaching agents, bleach activators, bleach catalysts, esterquats, silicone oils, emulsifiers, thickeners, electrolytes, pH adjusters, fluorescent agents, dyes, hydrotopes, foam inhibitors, anti-redeposition agents, solvents, optical brighteners, graying inhibitors, anti-shrinking agents, anti-crease agents, dye transfer inhibitors, color protection agents, wetting enhancers, antimicrobial active ingredients, germicides, fungicides, antioxidants, corrosion inhibitors, rinse aids, preservatives, antistatic agents, ironing aids, repellents and impregnation agents, pearlescent agents, swelling and antislip agents, and UV absorbers, without being limited thereto.

Suitable ingredients and framework compositions for detergent and cleaning agent compositions (for example for detergents and fabric softeners) are disclosed, for example, in EP 3 110 393 B1. In various embodiments, the agent is a fabric softener or a liquid (textile) detergent.

Preparation Method

Methods for preparing core/shell microcapsules are known to a person skilled in the art. As a rule, an oil-based core material that is insoluble or poorly soluble in water is emulsified or dispersed in an aqueous phase containing the wall-forming agents. Depending on the viscosity of liquid core materials, a wide variety of units are used, from a simple stirrer to a high-performance disperser, which units distributes the core material into fine oil droplets. In the process, the wall formers are separated from the continuous water phase on the surface of the oil droplets and can subsequently be crosslinked.

This mechanism is used during in-situ polymerization of amino and phenoplast microcapsules and during coacervation of water-soluble hydrocolloids.

In contrast, during radical polymerization, oil-soluble acrylate monomers are used for the formation of wall. In addition, methods are used in which water-soluble and oil-soluble starting materials are reacted at the phase boundary of the emulsion droplets, which form the solid shell.

Examples thereof are the reaction of isocyanates and amines or alcohols to form polyurea or polyurethane walls (interfacial polymerization), but also the hydrolysis of silicate precursors with subsequent condensation, forming an inorganic capsule wall (sol-gel method).

In suitable methods for preparing microcapsules comprising a fragrance as the core material and a shell consisting of three layers, the barrier layer serving as a diffusion barrier is initially provided as a template. To construct this barrier layer, very small proportions of wall formers of the type mentioned are required. After the droplet formation at high stirring speeds, the sensitive templates are preferably provided with an electrically negative charge by means of suitable protective colloids (e.g. polyAMPS), such that neither Ostwald ripening nor coalescence can occur. After this stable emulsion has been prepared, a very thin shell (layer) can form with a greatly reduced stirring speed of the wall formers, for example a suitable precondensate based on aminoplast resin. The thickness of the shell can be further reduced, in particular, by adding an aromatic alcohol, e.g. m-aminophenol. This is followed by the formation of a production-ready shell structure which unexpectedly shows a good affinity to biopolymers such as gelatin or alginate when same are added and is deposited on the templates without the expected problems such as gelling of the batch, agglomerate formation, and incompatibility of the structuring agent.

By using the emulsion stabilizer, the deposition of the biopolymers can be further increased.

The microcapsule dispersion may be prepared according to the following method:

a) preparing an oil-in-water emulsion by emulsifying a core material in an aqueous phase in the presence of the wall-forming component(s) of the inner barrier layer with the addition of protective colloids;
b) depositing and curing the wall-forming component(s) of the barrier layer, the wall-forming component(s) of the barrier layer preferably being an aldehyde component, an amine component, and an aromatic alcohol, particularly preferably formaldehyde, melamine, and resorcinol;
c) optionally adding an emulsion stabilizer, the emulsion stabilizer being as defined herein;
d) adding the wall-forming component(s) of the stability layer, followed by deposition and curing, the wall-forming component(s) of the stability layer being at least one biopolymer, preferably a protein and/or a polysaccharide, particularly preferably gelatin and alginate, and a curing agent, preferably glutaraldehyde or glyoxal; and
e) optionally adding the wall-forming component(s) of the outer, third shell layer, followed by deposition and curing, the wall-forming component(s) of the outer, third shell layer preferably being an amine component, in particular melamine.

The emulsion stabilizer is preferably added slowly over at least two minutes. According to one embodiment, the microcapsule dispersion is stirred. A paddle stirrer, for example, may be used for the stirring. The stirring speed is preferably in the range of from 150 to 250 rpm. Above 250 rpm, there is a risk of air being introduced into the microcapsule dispersion. Below 150 rpm, the mixing may not be sufficient.

The temperature is preferably in the range of from 15° C. to 35° C. The temperature may be 15° C., 18° C., 20° C., 23° C., 25° C., 28° C., 30° C., 33° C., or 35° C. The temperature is particularly preferably 25° C. After being added, the microcapsule dispersion is stirred until a homogeneous mixture is formed. In one embodiment, the microcapsule dispersion is stirred for at least 5 min after being added. In a preferred embodiment, the microcapsule dispersion is stirred for at least 10 min after being added.

Alternatively, steps a) and b) can be carried out as follows:

a) preparing an oil-in-water emulsion by emulsifying a core material in an aqueous phase in the presence of the wall-forming component(s) of the inner barrier layer, optionally with addition of protective colloids;

b) depositing and curing the wall-forming component(s) of the inner barrier layer, the wall-forming component(s) of the inner barrier layer preferably being an aldehyde component, an amine component, and an aromatic alcohol.

This method can be carried out either sequentially or as a so-called one-pot method. In the sequential method, in a first method, only steps a) and b) are carried out until microcapsules having only the inner barrier layer as the shell (intermediate microcapsules) are obtained. Subsequently, some or all of these intermediate microcapsules are then transferred into another reactor. The further reaction steps are then carried out therein. In the single-pot method, all method steps are carried out in a batch reactor. Performing the method without changing reactors is particularly time-saving.

For this purpose, the overall system should be tailored to the one-pot method. This allows for the correct choice of solid fractions, the correct temperature control, the tailored addition of formulation constituents, and the sequential addition of the wall formers.

In one embodiment of the method, the method comprises preparing a water phase by dissolving a protective colloid, in particular a polymer based on acrylamide sulfonate and a methylated prepolymer, in water. The prepolymer is preferably produced by reacting an aldehyde with either melamine or urea. Methanol can optionally be used here.

Furthermore, in the method, the water phase can be mixed by means of stirring and a first temperature can be set, the first temperature being in the range of from 30° C. to 40° C. Subsequently, an aromatic alcohol, in particular phloroglucinol, resorcinol, or aminophenol can be added to the water phase and dissolved therein.

Alternatively, an oil phase can be prepared by mixing a fragrance composition or a phase change material (PCM) with aromatic alcohols, in particular phloroglucinol, resorcinol, or aminophenol. Alternatively, reactive monomers or diisocyanate derivatives can also be introduced into the fragrance composition. Subsequently, the first temperature can be set.

A further step may be the preparation of a two-phase mixture by adding the oil phase to the water phase and subsequently increasing the rotational speed.

Subsequently, the emulsification can be started by adding formic acid. Regular determination of the particle size is possible here. Once the desired particle size is reached, the two-phase mixture can be stirred further and a second temperature for curing the capsule walls can be set. The second temperature may be in the range of from 55° C. to 65° C.

Subsequently, a melamine dispersion can be added to the microcapsule dispersion and a third temperature set, the third temperature preferably being in the range of from 75° C. to 85° C.

Another suitable step is the addition of an aqueous urea solution to the microcapsule dispersion. Subsequently, the emulsion stabilizer is added to the microcapsule dispersion before said dispersion is added to a solution of gelatin and alginate in order to produce the stabilization layer.

In this case, cooling to 45° C. to 55° C. would be carried out afterwards, and the pH of the microcapsule dispersion would be set to a value in the range of from 3.5 to 4.1, in particular 3.7.

The microcapsule dispersion can then be cooled to a fourth temperature, the fourth temperature being in the range of from 20° C. to 30° C. It can subsequently be cooled to a fifth temperature, the fifth temperature being in a range of from 4° C. to 17° C., in particular 8° C.

Subsequently, the pH of the microcapsule dispersion would be set to a value in the range of from 4.3 to 5.1 and glutaraldehyde or glyoxal would be added. The reaction conditions, in particular the temperature and pH, can be selected differently depending on the crosslinker. A person skilled in the art can derive the appropriate conditions, for example, from the reactivity of the crosslinker. The crosslinking density of the first layer (stability layer) and thus, for example, the tightness and degradability of the microcapsule shell is influenced by the amount of glutaraldehyde or glyoxal added. Accordingly, a person skilled in the art can vary the amount in a targeted manner in order to adapt the property profile of the microcapsule. A melamine suspension consisting of melamine, formic acid, and water can be prepared in order to produce the additional third layer. The melamine suspension is added to the microcapsule dispersion. Finally, the pH of the microcapsule dispersion would be set to a value in the range of from 9 to 12, in particular 10 to 11.

In addition, the microcapsule dispersion can be heated to a temperature in the range of from 20° C. to 80° C. for the curing in step e). This temperature can have an influence on the color fastness of the microcapsules. The temperature may be 20° C., 25° C., 30° C., 35° C., 40° C., 45° C., 50° C., 55° C., 60° C., 65° C., 70° C., 75° C., or 80° C. Below a temperature of 20° C., no influence on the color fastness is to be expected. A temperature of above 80° C. could have a negative effect on the microcapsule properties. According to one embodiment, the temperature is in the range of from 30° C. to 60° C. According to a preferred embodiment, the temperature is in the range of from 35° C. to 50° C.

According to one embodiment, the microcapsule dispersion is kept at the heating temperature for a period of at least 5 minutes. The period may be 10 minutes, 15 minutes, 20 minutes, 25 minutes, 30 minutes, 35 minutes, 40 minutes, 45 minutes, 50 minutes, 55 minutes, 60 minutes, 70 minutes, 80 minutes, 90 minutes, 100 minutes, 110 minutes, or 120 minutes. According to one embodiment, the microcapsule dispersion is kept at the heating temperature for a period of at least 30 minutes. According to one embodiment, the microcapsule dispersion is kept at the heating temperature for a period of at least 60 minutes.

In a method step for preparing the microcapsule dispersion, the emulsifier, selected from the group of ethoxylated, hydrogenated castor oils, is added. The emulsifier, for example Eumulgin® HRE 40, is preferably added after the curing step e). In the process, the microcapsules are typically dispersed by means of suitable agents into an aqueous continuous phase which already contains the emulsifier used and thus produces the slurries. The amounts/concentrations of emulsifier, microcapsules and water used are as defined above.

As an alternative to using the emulsifier, i.e. the hydrogenated, ethoxylated castor oil, the phase stability of dispersions of the microcapsules used in a fabric softener base can be improved by pre-diluting the microcapsule dispersion.

When diluting a microcapsule dispersion containing biodegradable micro capsules comprising a core material and a shell, wherein the shell consists of at least one barrier layer and a stability layer, wherein the barrier layer surrounds the core material, wherein the stability layer comprises at least one biopolymer, and the barrier layer is arranged on the outer surface, and wherein, an emulsion stabilizer is optionally arranged at the transition from barrier layer to stability layer; in an aqueous solution the minimum proportion of the aqueous solution in ratio to the microcapsule dispersion is 1:99.

The microcapsule dispersion can be diluted with the aqueous solution with a ratio of aqueous solution to microcapsule dispersion of 1:19, 1:15, 1:13, 1:11, 1:9, 1:7, 1:5, 1:4, 1:3, 1:2, 1:1, 2:1, 3:1, 4:1, 5:1, 7:1, 9:1, 11:1, 13:1, 15:1 or 19:1. According to one embodiment, the microcapsule dispersion is diluted with the aqueous solution to a ratio of aqueous solution to microcapsule dispersion in the range of 1:15 to 9:1. According to one embodiment, the microcapsule dispersion is diluted with the aqueous solution to a ratio of aqueous solution to microcapsule dispersion in the range of 1:9 to 5.1. According to one embodiment, the microcapsule dispersion is diluted with the aqueous solution to a ratio of aqueous solution to microcapsule dispersion in the range of 1:3 to 2:1.

Alternatively, it is preferred if the microcapsule dispersion is prepared according to a method that comprises the following steps:

a) preparing an oil-in-water emulsion by emulsifying a core material in an aqueous phase in the presence of the wall-forming component(s) of the inner barrier layer with the addition of protective colloids;
b) depositing and curing the wall-forming component(s) of the barrier layer, the wall-forming component(s) of the barrier layer preferably being an aldehyde component, an amine component, and an aromatic alcohol, particularly preferably formaldehyde, melamine, and resorcinol;
c) optionally adding an emulsion stabilizer, the emulsion stabilizer being as defined herein;
d) adding the wall-forming component(s) of the stability layer, followed by deposition and curing, the wall-forming component(s) of the stability layer being at least one biopolymer, preferably a protein and/or a polysaccharide, particularly preferably gelatin and alginate, and a curing agent, preferably glutaraldehyde or glyoxal; and
e) optionally adding the wall-forming component(s) of the outer, third shell layer, followed by deposition and curing, the wall-forming component(s) of the outer, third shell layer preferably being an amine component, in particular melamine.
f) diluting the microcapsule dispersion in an aqueous solution to a microcapsule concentration in the range of 0.1 wt. % to 50 wt. %.

According to one embodiment, the aqueous solution consists of water. The temperature of the aqueous solution is in the range of from 1° C. to 100° C. During introduction into the product, the temperature can be for example 1° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C. or 100° C. According to one embodiment, the temperature of the aqueous solution is in the range of from 15° C. to 90° C. According to one embodiment, the temperature of the aqueous solution is in the range of from 30° C. to 80° C. According to one embodiment, the temperature of the aqueous solution is in the range of from 40° C. bis 80° C. According to one embodiment, the temperature of the aqueous solution is in the range of from 50° C. bis 70° C. According to one embodiment, the temperature of the aqueous solution is at approximately 60° C.

The microcapsule dispersion is preferably diluted shortly after preparation, i.e. after step d) or e) is complete. The time between step d) or e) and dilution f) is at most six months. The time between step d) or e) and dilution f) can be for example 5 minutes, 30 minutes, 1 hour, 2 hours, 4 hours, 6 hours, 8 hours, 10 hours, 12 hours, 18 hours, 24 hours, 2 days, 4 days, 7 days, 2 weeks, 3 weeks, 4 weeks, 2 months, 3 months, 4 months, 5 months or 6 months. According to one embodiment, the time between step d) or e) and dilution f) is at most 1 week. According to one embodiment, the time between step d) or e) and dilution f) is at most 2 days.

The diluted microcapsule concentration can be 0.1 wt. %, 0.2 wt. %, 0.5 wt. %, 0.8 wt. %, 1.0 wt. %, 1.5 wt. %, 2.0 wt. %, 2.5 wt. %, 3.0 wt. %, 3.5 wt. %, 4.0 wt. %, 4.5 wt. %, 5.0 wt. %, 5.5 wt. %, 6.0 wt. %, 6.5 wt. %, 7.0 wt. %, 7.5 wt. %, 8.0 wt. %, 8.5 wt. %, 9.0 wt. %, 9.5 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 25 wt. %, 30 wt. %, 35 wt. %, 40 wt. %, 45 wt. % or 50 wt. %. According to one embodiment, the microcapsule concentration is in the range of from 5 wt. % to 30 wt. %. According to one embodiment, the microcapsule concentration is in the range of from 8 wt. % to 20 wt. %. According to one embodiment, the microcapsule concentration is in the range of from 10 wt. % to 15 wt. %.

Diluting the microcapsule dispersion prior to metering into the fabric softener base (predilution) does not completely achieve the phase stability that is achieved with the hydrogenated, ethoxylated castor oil. Nevertheless, the phase stability is significantly better than when metering without pretreatment.

The diluted microcapsule dispersion is preferably added into the product for which it is provided while still warm. As a result, a method for preparing a product may include preparing the microcapsule dispersion and the additional step g) of introducing the microcapsule dispersion into the product.

Methods for thoroughly mixing microcapsule dispersions into end products are known to a person skilled in the art. The microcapsule dispersion is preferably introduced into the product shortly after dilution. The time between dilution and introduction into the product is at most 6 months. The time between dilution and introduction into the product can be for example 5 minutes, 30 minutes, 1 hour, 2 hours, 4 hours, 6 hours, 8 hours, 10 hours, 12 hours, 18 hours, 24 hours, 36 hours, 2 days, 4 days, 7 days, 2 weeks, 3 weeks, 4 weeks, 2 months, 3 months, 4 months, 5 months or 6 months. According to one embodiment, the time between dilution and introduction into the product is at most 1 week. According to one embodiment, the time between dilution and introduction into the product is at most 2 days.

The microcapsule dispersion is preferably added into the product while still warm. The temperature during introduction into the product is at least 20° C. The temperature during introduction into the product can for example be 20° C., 25° C., 30° C., 35° C., 40° C., 45° C., 50° C., 55° C., 60° C., 65° C., 70° C., 75° C., 80° C., 85° C., 90° C., 95° C. or 100° C. According to one embodiment, the temperature during introduction into the product is in the range of from 20° C. to 90° C. According to one embodiment, the temperature of the aqueous solution is in the range of from 25° C. to 70° C. According to one embodiment, the temperature of the aqueous solution is in the range of from 30° C. to 60° C. According to one embodiment, the temperature of the aqueous solution is in the range of from 40° C. to 50° C. According to one embodiment, the temperature of the aqueous solution is approximately 45° C.

It is also possible to add the emulsifier (hydrogenated, ethoxylated castor oil) to the microcapsule dispersion after predilution, before the dispersion is added into the end product, for example a fabric softener. As a result, the phase stability can be further improved. According to one embodiment, the emulsifier is added into the prediluted microcapsule dispersion in a concentration in the range of from 0.1 wt. % to 50 wt. %.

As a result, microcapsule dispersions are also preferred which contain biodegradable microcapsules, comprising a core material and a shell, wherein the shell consists of at least one barrier layer and a stability layer, wherein the barrier layer surrounds the core material, wherein the stability layer comprises at least one biopolymer and is arranged on the outer surface of the barrier layer, and wherein an emulsion stabilizer is optionally arranged at the transition from the barrier layer to the stability layer; prepared according to a method according to the second aspect, wherein the microcapsule dispersion is diluted in an aqueous solution after step d) or 3) to a microcapsule concentration in the range of from 0.1 wt. % to 50 wt. %.

According to one embodiment of the microcapsule dispersion, in the preparation method an emulsifier is not added to the microcapsule dispersion. According to one embodiment of the microcapsule dispersion, in the preparation method the emulsifier is added to the microcapsule dispersion after dilution f).

Microcapsule Dispersion and Coloring

Microcapsules are generally present in the form of microcapsule dispersions. Despite the use of aromatic alcohol in the barrier layer of the microcapsule shell, the microcapsule dispersions with the microcapsules described herein have only a low degree of coloration.

To qualify the discoloration, the spectral locus in the L*a*b* color space was determined for the microcapsules described herein. The L*a*b* color model is standardized in EN ISO 11664-4 "Colorimetry—Part 4: CIE 1976 L*a*b* Colour space". The L*a*b* color space (also: CIELAB, CIEL*a*b*, Lab colors) describes all perceivable colors. It uses a three-dimensional color space in which the lightness value L* is perpendicular to the color plane (a*,b*). The a-coordinate indicates the chromaticity and color intensity between green and red and the b-coordinate indicates the chromaticity and color intensity between blue and yellow. The greater the positive a- and b-values and the smaller the negative a- and b-values, the more intense the hue. If a=0 and b=0, an achromatic hue is present on the lightness axis. The properties of the L*a*b* color model include device independence and perceptuality, which means that colors are defined independently of the type of production or reproduction technique thereof as they are perceived by a normal observer in standard light conditions.

The microcapsule dispersions described have a spectral locus with an L* value of at least 50 in the L*a*b* color space. The L'value may, for example, be 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80. According to a preferred embodiment, the microcapsule dispersions have a spectral locus with an L* value of at least 50 in the L*a*b* color space. The spectral locus is particularly preferably at least 60.

In addition, the microcapsule dispersions produced using the described preparation methods are particularly color-stable. The spectral locus of the microcapsule dispersion has an L* value of at least 50 in the L*a*b* color space after storage. The L* value after storage may be, for example, 51, 52, 53, 54, 55, 55, 56, 57, 58, 59, 60, 61, 62, 63, 64, 65, 66, 67, 68, 69, 70, 71, 72, 73, 74, 75, 76, 77, 78, 79, or 80. According to a preferred embodiment, the microcapsule dispersions have a spectral locus with an L* value of at least 60 in the L*a*b* color space after storage. The spectral locus is particularly preferably at least 65.

According to one embodiment, the storage time is at least four weeks, preferably at least six weeks, and in particular at least eight weeks.

EXAMPLES

The microcapsule dispersions in the following examples all contain 5 wt. % of an emulsifier from the group of ethoxylated, hydrogenated castor oils having an EO value of 40 (slurry =suspension), specifically Eumulgin® HRE 40. The emulsifier was added to the microcapsule dispersions after preparation of the microcapsule dispersions after prior melting, in particular directly before metering into the fabric softener base.

Example 1—Preparation of Reference Microcapsules Using Melamine-Formaldehyde Formulation

1.1 Materials

The materials used for preparing the melamine-formaldehyde reference microcapsules are shown in Table 1.

TABLE 1

List of substances used to prepare MC2

| Trade name* | Substance designation | Concentration/ wt.% | MC2 Initial weight/g |
|---|---|---|---|
| — | DI water | 100 | 187.5 |
| Dimension ™ SD from Solenis | 1,3,5-triazine-2,4,6-triamine, polymer with formaldehyde, methylated (content W/W): >=60% to <=80%), in water | 67 | 42.5* |
| Dimension ™ PA 140 from Solenis | Polymer based on: acrylamide sulfonate | 20 | 35.0* |
| Weiroclean from Kurt Kitzing GmbH | Core material (e.g. fragrance oil, PCM, etc.) | 100 | 192.5* |
| — | Formic acid | 10 | 8.8 |
| Melafine ® from OCI Nitrogen B.V. | Melamine suspension [1)] | 27 | 48.8 |
| — | Urea solution | 28.6 | 70.0 |

[1)] Concentration based on the acidified suspension

*Amounts of the components refer to the commercial goods and are used as supplied.

1.2 Preparation Method (Based on BASF Patent EP 1 246693 B1)

Dimension SD was stirred into DI water and then Dimension PA140 was added and stirred until a clear solution was formed. The solution was heated to 30-35° C. in a water bath. During stirring with a dissolver disk, the perfume oil was added at 1100 rpm. The pH of the oil-in-water emulsion was set to 3.3-3.8 using 10% formic acid. Subsequently, the emulsion was stirred further at 1100 rpm for 30 min until a droplet size of 20-30 μm was reached or longer until the desired particle size of 20-30 μm (peak max) is reached. The particle size was determined by means of a Beckman Coulter device (laser diffraction, Fraunhofer method). The speed was reduced as a function of the viscosity in order to ensure good mixing. Stirring took place at this speed for a further 30 min at 30 to 40° C. Subsequently, the emulsion was heated to 60° C. and stirred further. The melamine suspension was set to a pH of 4.5 using formic acid (10%) and metered into the reaction mixture. The batch was kept at 60° C. for 60 min and then heated to 80° C. After stirring at 80° C. for 60 min, the urea solution was added.

After being cooled to room temperature, the microcapsule dispersion was filtered using a 200 μm filter sieve.

Example 2—Preparation of Slurry 2 and Slurry 5 Microcapsule Dispersions According to the Non-Limiting Embodiments Herein and of MC1 Reference Capsules not According to the Present Embodiments Herein

2.1 Materials

The materials used for preparing slurry 2 and slurry 5 microcapsules according to the non-limiting embodiments herein are shown in Table 2.

TABLE 2

List of substances used to prepare slurry 2 and 5

| Trade name | Substance designation | Concentration/ wt.% | Slurry 2 Initial weight/g | Slurry 5 Initial weight/g |
|---|---|---|---|---|
| | DI water addition 1 | 100 | 35.2 | 39.6 |
| Dimension ™ SD from Solenis | 1,3,5-triazine-2,4,6-triamine, polymer with formaldehyde, methylated (content W/W): >=60% to <=80%), in water | 67 | 2.1* | 1.7* |
| Dimension ™ PA 140 from Solenis | Polymer based on: acrylamide sulfonate addition 1 | 20 | 4.6* | 3.8* |
| Weiroclean from Kurt Kitzing GmbH | Core material (e.g. fragrance oil, PCM, etc.) | 100 | 52.8* | 52.6* |
| — | Resorcinol solution | 3.2 | 12.7 | 11.9 |
| — | Formic acid addition 1 | 10 | 0.7 | 0.4 |
| Melafine ® from OCI Nitrogen B.V. | Melamine suspension addition 1 [1)] | 27 | 2.6 | 2.0 |
| — | Urea solution | 41.9 | 2.6 | 2.2 |
| Dimension ™ PA 140 from Solenis | Polymer based on: acrylamide sulfonate addition 2 | 20 | 9.5* | 9.6* |
| — | Tap water | 100 | 136.2 | 135.6 |
| — | Sodium sulfate | 100 | 0.6* | 0.6* |
| Scogin ® MV from DuPont Nutrition Ireland | Sodium alginate | 100 | 2.0* | 2.0* |
| Edible gelatin powder from Ewald-Gelatine GmbH | Porcine gelatin | 100 | 8.4* | 8.4* |
| — | Formic acid addition 2 | 20 | 2.5 | 2.5 |
| — | Sodium hydroxide addition 1 | 20 | 2.4 | 2.3 |
| Glutaraldehyde, 50% aq. soln. from Alfa Aesar | Glutaraldehyde solution | 50 | 2.6* | 2.6* |
| Melafine ® from OCI Nitrogen B.V. | Melamine suspension addition 2 [1)] | 27 | 27.5 | 27.4 |
| — | Sodium hydroxide addition 2 | 20 | 4.7 | 4.7 |

[1)] Concentration based on the acidified suspension.

2) The given amounts for acids/alkalis are guidelines. They are adjusted to the pH range mentioned in the experimental procedure.

*Amounts of the components refer to the commercial goods and are used as supplied.

The materials used for preparing the MC1 reference microcapsules are shown in Table 3.

TABLE 3

List of substances used to prepare MC1

| Trade name | Substance designation | MC1 Concentration/ wt.% | MC1 Initial weight/g |
|---|---|---|---|
| | DI water addition 1 | 100 | 34.9 |
| Dimension ™ SD from Solenis | 1,3,5-triazine-2,4,6-triamine, polymer with formaldehyde, methylated (content W/W): >= 60% to <= 80%), in water | 67 | 1.6* |
| Dimension ™ PA 140 from Solenis | Polymer based on: acrylamide sulfonate | 20 | 3.4* |
| Weiroclean from Kurt Kitzing GmbH | Core material (e.g. fragrance oil, PCM, etc.) | 100 | 38.8* |
| — | Resorcinol solution | 12.2 | 2.5 |
| — | Formic acid addition 1 | 20 | 0.5 |
| Melafine ® from OCI Nitrogen B.V. | Melamine suspension addition 1 [1)] | 27 | 1.9 |
| — | Urea solution | 16.6 | 4.7 |
| — | Tap water | 100 | 100.19 |
| — | Sodium sulfate | 100 | 0.5* |
| Edible gelatin powder from Ewald-Gelatine GmbH | Porcine gelatin | 100 | 6.2* |
| Scogin ® MV from DuPont Nutrition Ireland | Sodium alginate | 100 | 1.4* |
| — | Formic acid addition 2 | 20 | 1.4 |
| — | Sodium hydroxide addition 1 | 20 | 0.8 |
| — | Glutaraldehyde solution | 50 | 1.9 |
| Melafine ® from OCI Nitrogen B.V. | Melamine suspension addition 2 [1)] | 27 | 6.7 |
| — | Sodium hydroxide addition 2 | 20 | 2.2 |

1) Concentration based on the acidified suspension.

2) The given amounts for acids/alkalis are guidelines. They are adjusted to the pH range mentioned in the experimental procedure.

*Amounts of the components refer to the commercial goods and are used as supplied.

2.2 Preparation Method for the MC1 Microcapsules not According to the Non-Limiting Embodiments Herein To prepare the reaction mixture 1, Dimension PA140 and Dimension SD were weighed with DI water addition 1 in a beaker and premixed using a 4 cm dissolver disk. The beaker was secured in a water bath and stirred using the dissolver disk at 500 rpm at 30° C. until a clear solution was formed.

As soon as the Dimension SD/Dimension PA140 solution was clear and reached 30-40° C., the amount of perfume oil was slowly added and the speed was adjusted in such a way (1100 rpm) that the desired particle size is thus achieved. The pH of this mixture was then acidified by adding formic acid addition 1. It was emulsified for 20-30 min or for longer until the desired particle size of 20-30 µm (peak max) is reached. The particle size was determined by means of a Beckman Coulter device (laser diffraction, Fraunhofer method). After the particle size was reached, the speed was reduced in order to ensure gentle mixing.

Subsequently, the resorcinol solution was stirred in and preformed under gentle stirring for 30-40 min. After the preforming time had elapsed, the emulsion temperature was increased to 50° C. within 15 min. Upon reaching this temperature, the mixture was increased to 60° C. over a period of 15 min and this temperature was maintained for a further 30 min. Subsequently, the melamine suspension addition 1 was adjusted to a pH of 4.5 using 20% formic acid and metered into the reaction mixture over a period of 90 min. Afterwards, the temperature was maintained for 30 min. After the 30 min had elapsed, the temperature was initially increased to 70° C. within 15 min. Subsequently, the temperature was increased to 80° C. within 15 min and maintained for 120 min. Afterwards, the aqueous urea solution was added, the heat source was switched off, and the reaction mixture 1 was cooled to room temperature. In a separate beaker, sodium sulfate was dissolved in tap water while being stirred using a paddle stirrer at 40-50° C. Sodium alginate and porcine gelatin are slowly sprinkled into the heated water. After all solids had been dissolved, reaction mixture 1 was added to the prepared gelatin/sodium alginate solution while being stirred. When a homogeneous mixture was obtained, the pH value was adjusted to 3.9 by slow dropwise addition of the formic acid addition 2, then the heat source was removed. Subsequently, the batch was cooled to room temperature. After reaching room temperature, the reaction mixture was cooled using ice. When a temperature of 8° C. was reached, the ice bath was removed and the pH was increased to 4.7 with sodium hydroxide addition 1. Glutaraldehyde was then added. Care was taken to ensure that the temperature does not exceed 16-20° C. until the glutaraldehyde is added.

Subsequently, the melamine suspension addition 2 acidified by means of 20% formic acid to a pH of 4.5 was metered in slowly. Then, the reaction mixture was heated to 60° C. and, when reached, said temperature was maintained for 60 min. After this time, the heat source was removed and the microcapsule dispersion was stirred gently for 14 h. After the 14 h had elapsed, the microcapsule dispersion was adjusted to a pH of 10.5 by means of sodium hydroxide addition 2.

2.3 Preparation Method for the Slurry 2 and Slurry 5 Microcapsule Dispersions According to the Non-Limiting Embodiments Herein To prepare the reaction mixture 1, Dimension PA140 addition 1 and Dimension SD were weighed with DI water addition 1 in a beaker and premixed using a 4 cm dissolver disk. The beaker was secured in a water bath and stirred using the dissolver disk at 500 rpm at 30° C. until a clear solution was formed.

As soon as the Dimension SD/Dimension PA140 solution was clear and reached 30-40° C., the core material was slowly added and the speed was adjusted in such a way (e.g. 1100 rpm) that the desired particle size is thus achieved. The pH of this mixture was then acidified by adding formic acid addition 1 (pH=3.3-3.5).

It was emulsified for 20-30 min or for longer until the desired particle size of 20-30 µm (peak max) is reached. The particle size was determined by means of a Beckman Coulter device (laser diffraction, Fraunhofer method). After the particle size was reached, the speed was reduced in order to ensure gentle mixing and the resorcinol solution was added.

Gentle stirring was performed for 30-40 min. After the preforming time had elapsed, the emulsion temperature was increased to 50° C. within 15 min. Upon reaching this temperature, the mixture was increased to 60° C. over a period of 15 min and this temperature was maintained for a further 30 min. Subsequently, the melamine suspension addition 1 was adjusted to a pH of 4.5 using 20% formic acid and metered into the reaction mixture over a period of 90 min.

Afterwards, the temperature was maintained for 30 min. After the 30 min had elapsed, the temperature was initially increased to 70° C. within 15 min. Subsequently, the temperature was increased to 80° C. within 15 min and maintained for 90 min.

Afterwards, the aqueous urea solution was added, the heat source was switched off, and the reaction mixture 1 was cooled to room temperature. After reaction mixture 1 has reached room temperature, Dimension PA140 addition 2 is added.

In a separate beaker, sodium sulfate was dissolved in tap water while being stirred using a paddle stirrer at 40-50° C. Sodium alginate and porcine gelatin are slowly sprinkled into the heated tap water. After all solids had been dissolved, reaction mixture 1 was added to the prepared gelatin/sodium alginate solution while being stirred. When a homogeneous mixture was obtained, the pH value was adjusted to 3.7 by slow dropwise addition of the formic acid addition 2, then the heat source was removed and the batch was cooled naturally to room temperature.

After reaching room temperature, the reaction mixture was cooled using ice. When a temperature of 8° C. was reached, the ice bath was removed and the pH was increased to 4.7 with sodium hydroxide addition 1. Glutaraldehyde 50% was then added. Care was taken to ensure that the temperature does not exceed 16-20° C. until the glutaraldehyde 50% is added.

Subsequently, the melamine suspension addition 2 acidified by means of 20% formic acid to a pH of 4.5 was metered in within a period of approx. 2 min. The microcapsule dispersion was subsequently stirred gently at room temperature for 14 h. After the 14 h had elapsed, the microcapsule dispersion was adjusted to a pH of 10.5 within a period of approx. 15 min by means of sodium hydroxide addition 2.

Example 3—Stability

The stability of the capsules described herein during use in capsule slurries and commercially available fabric softener formulations was investigated. As a comparison, commercially available melamine-formaldehyde capsules (MF capsules) and the capsules according to PCT/EP2020/085804 were used, which have no emulsion stabilizer between the inner and outer shells.

For the evaluation of the phase stability of the microcapsule slurry and the microcapsules in an end product (fabric softener formulation), corresponding formulations were formulated with the addition of the various perfume microcapsules (0.3 wt. % of a capsule slurry with the same capsule quantities) and stored for 4 weeks at room temperature (20-25° C.). Stability was evaluated on the following scale: 1=no phase separation, 2=slight phase separation, and 3=average phase separation.

TABLE 4

Phase stability of the capsules after storing for 4 weeks at room temperature

| Product | Phase stability after 4 weeks at room temperature |
|---|---|
| Fabric softener (0.3 wt.% of capsule slurry in each case) | |
| MF capsules (comparison) | 1 |
| Capsules according to PCT/EP2020/085804 (comparison) | 3 |
| Capsules with emulsion stabilizer according to the description (comparison) | 2 |
| Capsules with emulsion stabilizer according to the description and emulsifier (according to the non-limiting embodiments herein) | 1 |
| Capsule slurry | |
| MF capsules (comparison) | 3 |
| Capsules according to PCT/EP2020/085804 (comparison) | 3 |
| Capsules with emulsion stabilizer according to the description (comparison) | 3 |
| Capsules with emulsion stabilizer according to the description and emulsifier (according to the non-limiting embodiments herein) | 2 |

The results show that an improved phase stability of the microcapsules can be achieved by using the emulsifier according to the non-limiting embodiments herein both in the capsule slurry and the end product.

Example 4—Stability of Alternative Microcapsule Slurry Having Predilution

In this example, the emulsifier, i.e. the ethoxylated, hydrogenates castor oil is not used.

25 g of microcapsule slurry was placed in a 100 ml beaker and provided with a stirring bar. While stirring at 600 rpm, dilution with 25 g tap water (T=60° C.) was carried out. The water was added in a thin stream and subsequently homogenized for approximately 1 minute. The diluted batch was introduced into the fabric softener base while still warm.

In order to introduce the slurry into the fabric softener base, 45.83 g fabric softener base was placed in a 100 ml beaker and provided with a stirring bar. Subsequently, a pipette was wetted with the corresponding slurry in advance in order to reduce a weighing error and the corresponding mass of slurry (in total 4.17 g) was slowly dropped in while stirring at 550 rpm.

In order to evaluate the phase stability of the microcapsule slurry, the prediluted microcapsule slurry, and in parallel a microcapsule slurry, was introduced into a fabric softener formulation formulated and either provided with an emulsifier or prediluted, and stored at room temperature (20-25° C.) for 4 weeks. The stability was evaluated on the following scale: 1=no phase separation, 2=slight phase separation, 3=average phase separation, 4=strong phase separation and 5=very strong phase separation. The results are shown in Table 5 below.

TABLE 5 phase stability of the capsules after introduction into the end product and after storage for 4 weeks at room temperature

| Fabric softener (1 wt.% capsule slurry in each case, based on the otro slurry) | Phase stability after introducing the capsule slurry | Phase stability after 4 weeks at room temperature |
|---|---|---|
| Capsules having emulsion stabilizer according to the description without emulsifier (comparison) | 2 | 2 |

TABLE 5-continued phase stability of the capsules after introduction into the end product and after storage for 4 weeks at room temperature

| Fabric softener (1 wt.% capsule slurry in each case, based on the otro slurry) | Phase stability after introducing the capsule slurry | Phase stability after 4 weeks at room temperature |
|---|---|---|
| Capsules having emulsion stabilizer according to the description without emulsifier, predilution (1:1) with 60° C. water | 1 | 2 |
| Capsules having emulsion stabilizer according to the description and emulsifier (according to the non-limiting embodiments herein) | 1 | 1 |

With regard to further advantageous embodiments of the agents and uses, reference is made to the general part of the description and to the appended claims in order to avoid repetition.

Finally, it is expressly pointed out that the above-described embodiments of the agents and uses are merely used to explain the claimed teaching, but do not restrict the teaching to these embodiments.

The invention claimed is:

1. A composition comprising:

biodegradable microcapsules wherein:

each biodegradable microcapsule comprises a core material and a shell, the shell comprises at least one barrier layer and a stability layer, the at least one barrier layer surrounds the core material, the stability layer comprises at least one biopolymer and is arranged on an outer surface of the at least one barrier layer, and an emulsion stabilizer is optionally arranged at the transition from the at least one barrier layer to the stability layer; and at least one emulsifier, wherein:

the at least one emulsifier is selected from the group of ethoxylated, hydrogenated castor oils having mean ethoxylation (EO) values ranging from 30 to 50, and the at least one emulsifier is present in an amount ranging from 0.001 wt. % to 0.08 wt. %, based on the total weight of the composition, wherein the composition is a detergent, a cleaning agent, a cosmetic agent, or any combination thereof.

2. The composition of claim 1, wherein the composition comprises the biodegradable microcapsules and the at least one emulsifier as a preformulation.

3. The composition of claim 1, wherein the composition comprises a microcapsule dispersion comprising the biodegradable microcapsules as the solid phase and water as a main constituent of a continuous phase.

4. The composition of claim 3, wherein the microcapsule dispersion further comprises the at least one emulsifier as a constituent of the continuous phase in which the biodegradable microcapsules are dispersed.

5. The composition of claim 3, wherein the water is present in the continuous phase in an amount of more than 50 wt. %, based on the total weight of the continuous phase.

6. The composition of claim 4, wherein the at least one emulsifier is present in the microcapsule dispersion in an amount of up to 50 wt. %, based on the total weight of the microcapsule dispersion.

7. The composition of claim 6, wherein the at least one emulsifier is present in the microcapsule dispersion in an amount that ranges from 0.5 wt. % to 50 wt. %, based on the total weight of the microcapsule dispersion.

8. The composition of claim 4, wherein the water is present in the continuous phase in an amount ranging from 60 wt. % to 95 wt. %, and the at least one emulsifier is present in the continuous phase in an amount ranging from 2 wt. % to 40 wt. %, based on the total weight of the continuous phase.

9. The composition of claim 3, wherein the biodegradable microcapsules are present in the microcapsule dispersion in an amount ranging from 1 wt. % to 60 wt. %, based on the total weight of the microcapsule dispersion.

10. The composition of claim 3, wherein the microcapsule dispersion is present in the composition in an amount of at least 0.1 wt. %, based on the total weight of the composition.

11. The composition of claim 1, wherein the at least one emulsifier comprises PEG-40 hydrogenated castor oil (INCI).

12. The composition of claim 1, wherein the composition has a pH of less than 11, a conductivity of at least 0.1 mS/cm, or both.

13. A composition comprising:

biodegradable microcapsules wherein:

each biodegradable microcapsule comprises a core material and a shell, the shell comprises at least one barrier layer and a stability layer, the at least one barrier layer surrounds the core material, the stability layer comprises at least one biopolymer and is arranged on an outer surface of the at least one barrier layer, and an emulsion stabilizer is optionally arranged at the transition from the at least one barrier layer to the stability layer; and at least one emulsifier, wherein:

the at least one emulsifier is selected from the group of ethoxylated, hydrogenated castor oils, and the at least one emulsifier is optionally present in an amount ranging from 0.001 wt. % to 0.25 wt. %, based on the total weight of the composition, wherein the core material of the biodegradable microcapsules comprises at least one perfume composition, and wherein the at least one perfume composition, based on the total weight of all odorants within the at least one perfume composition, comprises:

10 wt. % or less of odorants having a CLogP of 2.5 or less and a boiling point of 200° C. or more, 15 wt. % or less of at least one odorant having a CLogP of 4.0 or less and a boiling point of 275° C. or less, and 30 wt. % or less of at least one odorant having a vapor pressure of 5 Pa or less at 20° C., and wherein the composition is a detergent, a cleaning agent, a cosmetic agent, or any combination thereof.

14. The composition of claim 1, wherein the composition is a liquid.

15. The composition of claim 5, wherein the water is present in the continuous phase in an amount of more than 80 wt. %, based on the total weight of the continuous phase.

16. The composition of claim 7, wherein the at least one emulsifier is present in the microcapsule dispersion in an amount ranging from 2 wt. % to 10 wt. %, based on the total weight of the microcapsule dispersion.

17. The composition of claim 16, wherein the at least one emulsifier is present in the microcapsule dispersion in an amount ranging from 4 wt. % to 8 wt. % based on the total weight of the microcapsule dispersion.

18. The composition of claim 8, wherein the water is present in the continuous phase in an amount ranging from 70 wt. % to 95 wt. %, and the at least one emulsifier is present in the continuous phase in an amount ranging from 2 wt. % to 20 wt. %, based on the total weight of the continuous phase.

19. The composition of claim 3, wherein the biodegradable microcapsules are present in the microcapsule dispersion in an amount ranging from 25 wt. % to 35 wt. %, based on the total weight of the microcapsule dispersion.

* * * * *